US007100164B1

(12) United States Patent
Edwards

(10) Patent No.: US 7,100,164 B1
(45) Date of Patent: Aug. 29, 2006

(54) METHOD AND APPARATUS FOR CONVERTING A CONCURRENT CONTROL FLOW GRAPH INTO A SEQUENTIAL CONTROL FLOW GRAPH

(75) Inventor: Stephen A. Edwards, San Francisco, CA (US)

(73) Assignee: Synopsys, Inc., Mountain View, CA (US)

( * ) Notice: Subject to any disclaimer, the term of this patent is extended or adjusted under 35 U.S.C. 154(b) by 0 days.

(21) Appl. No.: 09/477,688

(22) Filed: Jan. 6, 2000

(51) Int. Cl.
*G06F 9/45* (2006.01)
*G06F 9/46* (2006.01)

(52) U.S. Cl. ............... 718/108; 718/100; 718/102; 717/136; 717/156

(58) Field of Classification Search ............... 709/100, 709/102, 107, 108; 717/136–140, 151, 154, 717/156, 157
See application file for complete search history.

(56) References Cited

U.S. PATENT DOCUMENTS

| | | | | |
|---|---|---|---|---|
| 5,659,754 | A | * | 8/1997 | Grove et al. ............... 717/158 |
| 6,081,665 | A | * | 6/2000 | Nilsen et al. ............... 717/116 |
| 6,102,968 | A | * | 8/2000 | Colby et al. ............... 717/126 |
| 6,421,815 | B1 | * | 7/2002 | Seawright ............... 716/7 |
| 6,463,582 | B1 | * | 10/2002 | Lethin et al. ............... 717/158 |

OTHER PUBLICATIONS

Baker, Brenda S. "An Algorithm for Structuring Flographs", Jan 1977. Journal of the Association for Computing Machinery, vol. 24, No. 1.*
Lin, Bill. "Efficient Compilation of Process-Based Concurrent Programs without Run-Time Scheduling", Feb. 23-26, 1998.Proceedings of Design, Automation and Test in Europe, pp. 211-217.□□.*

Stephen A. Edwards, "Compiling Esterel into Sequential Code," Proceedings of the 7th International Workshop on Hardware/Software Codesign, pp. 147-151 (May 1999).*

(Continued)

*Primary Examiner*—Meng-Al T. An
*Assistant Examiner*—Syed J Ali
(74) *Attorney, Agent, or Firm*—Jonathan T. Kaplan

(57) ABSTRACT

The present invention accepts an acyclic concurrent control-flow graph (CCFG) and produces a sequential control flow graph (SCFG) that, when executed, behaves functionally like the CCFG would if it were run on concurrent hardware. An SCFG can be easily translated into a traditional sequential programming language such as C or assembly to be executed on a traditional sequential processor.

Determining the order in which CCFG nodes will be run is the first step in the process. Control edges in the CCFG constrain the order in which CCFG nodes must run; communication between threads generally impose further constraints. An easy way to further constrain a valid order of CCFG nodes is to augment the CCFG with data dependence edges (representing inter-thread communication) and to then topologically sort the nodes in the augmented graph to produce an ordering.

Once the CCFG nodes are ordered, the procedure for producing the SCFG from the scheduled acyclic CCFG simulates the execution of the CCFG under an operating system supporting concurrent threads and creates an SCFG that, when executed, will reproduce the functional behavior of the CCFG running under this simulated operating system. The effects of context switching are largely compiled away by this simulation process. Each context switch is done by a single assignment that stores the state of the thread being suspended and a single branch that restores the state of the thread being resumed.

12 Claims, 35 Drawing Sheets

OTHER PUBLICATIONS

Gerard Berry, "Esterel on hardware," Philosophical Transactions of the Royal Society of London, Series A, 339:87-104 (1992).*

Gerard Berry and Georges Gonthier. "The Esterel Synchronous Programming Language: Design, Semantics, Implementation." Science of Computer Programming, 51 pages, Nov. 1992.

Bill Lin. "Software Synthesis of Process-Based Concurrent Programs." Proceedings of the 35th Design Automation Conference, pp. 502-505, San Francisco, CA, Jun. 1998.

Xiaohan Zhu and Bill Lin, "Compositional Software Synthesis of Communicating Processes," IEEE International Conference on Computer Design, Oct. 1999, pp. 646-651.

* cited by examiner

Figure 1

```
module EXAMPLE:

input RESET, START; output GOT;

signal REQUEST, GRANT in
  loop abort                         % RESET restarts the loop
    await START;
    emit REQUEST;
    present GRANT then emit GOT end
  ||                                 % run concurrently
    loop
      present REQUEST then emit GRANT end;
      pause;                         % wait for the next cycle
      pause
    end
  when RESET end
end.
```

Figure 2A p ; q                              p; q;

Figure 2B emit S                             S = 1;

Figure 2C loop p end                         for (;;) p;

Figure 2D present S then p else q end        if (S) p; else q;

Figure 3A pause

```
                    state = k;
                    if (level < 1) level = 1;
                    goto Join;
            case k:
```

Figure 3B await S

```
                    goto Entry;
            case k:
                    if (!S) {
                    Entry:
                            state = k;
                            if (level < 1) level = 1;
                            goto Join;
                    }
```

Figure 3C abort
    body
when S

```
                    goto Entry;
            case k:
                    if (!S)
                            switch (state) {
                                    Entry: body;
                            }
```

Figure 3D suspend

```
                    goto Entry;
            case k:
                    if (S) {
                            if (level < 1) level = 1;
                            goto Join;
                    }
                    switch (state) {
                            Entry: body;
                    }
``` body
when S

Figure 3E

```
signal S in                     S = 0;
                                goto Entry;
                            case k:
                                S = 0;
                                switch (state) {
            body                    Entry: body;
end                             }
```

Figure 3F

```
exit T;                         if (level < 2) level = 2;
                                goto Join;
```

Figure 3G

```
trap T in                    innerLevel = 0;
                             fork StartA, StartB;
                     case k:
                             innerLevel = 0;
                             fork ResumeA, ResumeB;

ResumeA:
                             switch (statep) {
          bodyA               StartA: bodyA;
                             case 0: ;
                             }
                             goto InnerJoin;

||                 ResumeB:
                             switch (stateq) {
          bodyA               StartB: bodyB;
                             case 0: ;
                             }
                             goto InnerJoin;

InnerJoin:
                             join;
  handle T do                switch (innerLevel) {
                             case 1:      /* paused */
                                     state = k;
                                     if (level < 1) level = 1;
                                     goto OuterJoin;
                             case 2:      /* exited */
             handler                 handler;
  end                                break;
                             }
```

Figure 4

```
                                    Start: goto L0;
                                    Resume:
                                    switch (s & 0x3) {
pause;                              L0:    s=1; goto Join;
pause;                              case 1: s=2; goto Join;
                                    case 2: goto L1;
abort                               case 3: if (!B)
                                            switch (s>>2 & 0x7 ) {
    pause;                          L1:    s=3 | 0<<2; goto Join;
    pause;                          case 0: s=3 | 1<<2; goto Join;
                                    case 1: goto L2;
    abort                           case 2: if (!A)
                                            switch (s>>5) {
        pause;                      L2:    s=3 | 2<<2 | 0<<5; goto Join;
        pause                       case 0: s=3 | 2<<2 | 1<<5; goto Join;
                                    case 1:
    when A;                         }
    pause;                                  s=3 | 2<<3; goto Join;
    pause                           case 3: s=3 | 2<<4; goto Join;
                                    case 4:
when B                              }
                                    s = 0; goto Join;
                                    case 0: ; /* not running */
                                    }
                                    Join:
```

Figure 5

```
loop
    trap T in
        loop
            present A
            then
                emit B
            end;
            pause;
        end
    ||
        pause;
        exit T;
    end
end
```

```
if (inLaterCycles) { if (A) then B = 1;
    /* pause (level 1) */
||
    /* exit T (level 2) */

} if (A) then B = 1;
    /* pause (level 1) */
||
    /* pause (level 1) */ inLaterCycles = 1;
```

Figure 6A

```
1   /* THE THREE MAIN DATA TYPES OF ACCFG: CNODE, PROCESS, and THREAD.
2   MAIN DATA TYPE OF SCFG IS SNODE.
3
4   cnode = node in the acyclic concurrent control-flow graph (accfg)
5   snode = node in the sequential control-flow graph (scfg) */
6
7   /* The properties of a cnode are defined as follows: */
8
9   cnode::pthreads;   /* Threads to which this cnode belongs ("parents") Most
10  nodes belong to exactly one thread. The exceptions are join nodes, which belong to each
11  thread they join, and the topmost process, which belongs to no thread. */
12
13  /* A "predecessor" is a (snode, condition) pair that will be used as the source and label
14  respectively of an added arc. Each predecessor is an snode that could run a cnode */
15
16  cnode::runningPredecessors;   /* set of normal snodes */
17  cnode::restartPredecessor;    /* restart snode */
18
19  /* The distinction between the two types of predecessor (i.e., "running" and "restart") is
    used in the "suspend any running thread in process p" routine, which avoids creating
21  save state nodes for restart nodes. */
22
23  cnode::index;   /* integer index of the node. (topological order number) */
24
25  cnode::state;   /* Possible states are: Running, Runnable, or Suspended. Only a
26  "process" can be in a "Running" state, which means it contains a thread which is
27  actively executing. */
```

Figure 6B

```
1   /* A Process is a cnode (and therefore inherits the properties of a cnode) that
2   corresponds to a fork node and contains one or more threads.
3         A process's state may be Suspended, Runnable, or Running.
4         A Suspended process is contained in a thread that is not running.
5         A Runnable process is contained in a thread that is running, but none of the
6   threads contained in the process are running. A Runnable process is ready to restart one
7   of the threads it contains.
8         A Running process means one of its contained threads is currently running (i.e.,
9   executing instructions).
10
11        Suspending the running thread within a process changes the process's state from
12  Running to Runnable. This is typically followed by starting (or restarting) another
13  thread, contained within the process, which changes the process's state from Runnable
14  back to Running. This suspension of one thread and the starting (or restarting) of
15  another thread is also known as a "context switch."
16
17        The properties of a process and a thread are as follows. */
18
19  process::threads;  /* The threads contained in the process */
20
21  process::runningThread;  /* Indicates which, if any, of the threads contained in
22  the process is the currently running thread. */
23
24  thread::process;  /* Which process contains this thread */
25
26  thread::cnodes;  /* The cnodes in this thread that could be executed next */
27
28  thread::stateVariable;  /* State variable used for saving the state of the thread
29  when the thread is suspended. This state variable is subsequently read when the thread
30  is resumed. */
```

Figure 6C

```
1    /* MAIN ROUTINE: "synthesize a scfg"
2    This main routine synthesizes the scfg from the input accfg */
3
4    synthesize a scfg
5    {
6    /* INITIALIZATION: Create the outermost process and a single thread within in. Put the
7    first scheduled node in this thread. The thread starts out suspended; the first iteration of
8    the main loop will resume it. */
9
10   en = create the SCFG entry node;
11
12   op = create the outermost process;
13
14   op.state = Runnable;
15
16   op.runningThread = none;
17
18   op.runningPredecessors += (en, -);   /* Entry node "en" is made to be
19   the runningPredecessor of "op" and the edge from op to en has no label as indicated by
20   the hyphen "-". */
21
22   op.pthreads = empty  /* By definition, the outermost process is not in a thread. */
23
24   op.restartPredecessor = empty;
25
26   tt = new thread;
27
28   op.threads += tt;
29
30   tt.process = op;
31
32   fn = first node in the schedule;
33
34   /* Set the state variable used by the outermost thread */
35   tt.stateVariable = fn.index
36
37   tt.cnodes += fn;
38
39   fn.pthreads += tt;   /* Put the first node in the top thread */
40
41   fn.state = Suspended;
```

Figure 6D

```
1   /* MAIN LOOP: successively assigns to current node "cn" each cnode of the input accfg
2   in order of the topological sort. */
3
4   for each node cn in scheduled order {
5
6           sn = copy node cn and its expression into the SCFG;
7           th = first thread in cn.pthreads;  /* Thread of this node */
8
9       /* Rest of this loop is divided into four main code blocks labeled A, B, C and D.
10      For each cnode assigned to cn, a code block from A or B, and a code block
11      selected from C or D, is executed.
12
13      The pair of code blocks selected for execution depends on the type of the cnode,
14      and is illustrated by the following table:
15
16      cnode type:          Normal Fork Join
17      selection from A or B:   B    B    A
18      selection from C or D:   D    C    D
19
20      if ( cn is a join node ) {
21         /* CODE BLOCK A */
22              /* Earlier, this join node would have been placed in all of the threads it
23              was joining. Run it in its parent's thread. */
24              p = th.process;
25              th = thread in p.pthreads;  /* unique since this is a process */
26              switch to thread th;
27              suspend any running thread in p;
28              run cnode p as snode sn;
29              th.cnodes -= p;   /* Delete the now-terminated process */
30
31      } else {  /* cn is a Normal or Fork node */
32           /* CODE BLOCK B */
33              switch to thread th;
34              run cnode cn as snode sn;
35              /* We've run cn, so it no longer plays a role in the thread */
36              th.cnodes -= cn;
37      }
```

Figure 6E

```
1      if ( cn is a fork node ) {
2          /* CODE BLOCK C */
3          process = new process;
4          process.state = Runnable;
5          process.runningThread = none;
6          process.runningPredecessors += (sn, -);  /* Note that
7          edge from "process" to sn has a empty label */
8          process.restartPredecessor = empty;
9          th.cnodes += process;  /* Put the new process in its thread */
10         for ( each successor cns of cn ) {
11             /* Create a new thread for each successor and put the successor
12             node in the new thread. */
13             thread = new thread;
14             process.threads += thread;
15             thread.stateVariable = cns.index;  /* Set the state
16             variable for "thread" to have a default value being the topological
17             index of cns. */
18             thread.cnodes += cns;
19             put cnode cns in thread thread;
20             /* Initialize state of successor */
21             cns.state = Suspended;
22         }
23
24     } else {  /* This is a Normal or Join node */
25         /* CODE BLOCK D */
26         for ( each successor cns of cn ) {
27             th.cnodes += cns;
28             put cnode cns in thread th;
29             cns.runningPredecessors += (sn, edge
30             condition from cn to cns in the input accfg);
31         } /* end "for ( each successor cns of cn )" */
32     } /* end "else" */
33
34 } /* end MAIN LOOP */
35
36 } /* end "synthesize a scfg" */
```

Figure 6F

```
1   run cnode cn as snode sn
2   {
3   for ( each node snp in cn.runningPredecessors )
4         add an edge from snp to sn, labeled like the
5         predecessor edge from cn to snp;
6
7   if ( cn.restartPredecessor is not empty )
8         add an edge from cn.restartPredecessor to sn, labeled
9         like the predecessor edge from cn to
10        cn.restartPredecessor;
11
12  /* having used these predecessor edges, they should now be removed */
13  cn.runningPredecessor = empty;
14  cn.restartPredecessor = empty;
15  }
16
17
18  put cnode cns in thread th
19  {
20    if th is not already in cns.pthreads,
21       cns.pthreads += th;
22  }
```

Figure 6G

```
1    switch to thread th
2    {
3    /* "switch to thread th" does nothing if the thread is already running. If the thread is not
4    running, it saves the state of any already-running thread (suspends it) and restarts the
5    desired thread. */
6
7    /* If there is at least one thread above "th," make sure it is also running */
8    if ( th.process.pthreads is not empty )
9         /* The parent thread is unique for a process */
10        switch to thread th.process.pthreads;
11
12   p = th.process;
13
14   /* If a different thread is running, suspend it */
15   if ( p.state == Running AND p.runningThread != th )
16        suspend any running thread in p;
17
18   if ( p.state == Runnable ) {
19        /* Restart our thread by adding a restart node and making this restart node a
20        predecessor of each suspended node. */
21
22        rn = new restart node( th.stateVariable );   /* Build a
23        restart node (of SCFG) which tests state of the stateVariable for thread which is
24        to be switched to. This stateVariable needs to have been set appropriately when
25        thread th was previously suspended. */
26
27        run cnode p as snode rn;
28
29        for ( each cnode cn in th.cnodes ) {
30             cn.restartPredecessor = (rn, cn.index);  /* Create an
31             edge from cn to rn whose label has the value cn.index */
32
33             cn.state = Runnable;
34        }
35
36        p.state = Running;
37        p.runningThread = th;
38
39   } /* end "if (p.state == Runnable)" */
40
41   } /* end "switch to thread th" */
```

Figure 6H

```
1   suspend any running thread in process p
2   {
3   if ( p.state == Running ) {
4       /* This process has a running thread -- suspend it */
5       p.state = Runnable;
6       th = p.runningThread;
7       restartNode = none;  /* Set when the restart node needs a default arc
8       leading from it to suspend this thread */
9
10      /* Save state if there is more than one running cnode in the thread */
11      needToSaveState = true if there is more than one cnode
12      in th;
13      needToSaveState = false if there is not more than one
14      cnode in th;
15
16      /* Suspend each cnode in the the thread */
17
18      for ( each cnode cn in th.cnodes ) {
19
20          /* Suspend any running threads in a process node */
21          if ( cn is a process )
22              suspend any running thread in cn;
23
24          /* Suspend all running predecessors for this node */
25          if ( cn.runningPredecessors is not empty ) {
26
27              if ( needToSaveState ) {
28                  sn = new save state node (state for this
29                  thread = cn.index );  /* Makes the "expression"
30                  of sn be the following assignment statement:
31                  th.stateVariable = cn.index. */
32
33                  for ( each snode snp in
34                  cn.runningPredecessors )
35                      add an edge from snp to sn, labeled
36                      like the predecessor edge from cn
37                      to snp;
38
39                  cn.runningPredecessors = empty;  /* having
40                  used these predecessor edges, they should now be removed
41                  */
42
43                  p.runningPredecessors += (sn, -);  /* add
44                  an edge from p.runningPredecessors to sn, with no label */
```

Figure 6I

```
 1            } else {  /* do not save state */
 2                  for ( each snode snp in
 3                  cn.runningPredecessors )
 4                        p.runningPredecessors += (snp, take
 5                        label from the edge cn to snp);
 6
 7                  cn.runningPredecessors = empty;  /* having
 8                  used these predecessor edges, they should now be removed
 9                  */
10            }  /* end "else" */
11
12      }  /* end "if ( cn.runningPredecessors is not empty )" */
13
14      /* Rembmer the restart node if this node has a restart predecessor. */
15
16      if ( cn.restartPredecessor is not empty ) {
17         restartNode = cn.restartPredecessor;
18         /* Remove this precessor edge since it is empty */
19         cn.restartPredecessor = empty;
20      }
21
22      cn.state = Suspended;
23
24   }  /* end "for ( each cnode cn in th.cnodes )" */
25
26   p.runningThread = none;
27
28   if ( restartNode is not none ) {
29      /* At least one node had a restart predecessor: make sure an arc with a default
30      condition is added from the restart node to handle this condition */
31         p.runningPredecessors += (restartNode, -);
32   }
33
34 }  /* end if (p.state == Running) */
35
36 }  /* end "suspend any running thread in process p" */
```

INPUT ACCF-G

METHOD AND APPARATUS FOR CONVERTING A CONCURRENT CONTROL FLOW GRAPH INTO A SEQUENTIAL CONTROL FLOW GRAPH

FIELD OF THE INVENTION

The present invention relates generally to the conversion of concurrent program specifications into an equivalent sequential program specification, and more specifically to the conversion of control flow graphs.

BACKGROUND OF THE INVENTION

In the utilization of concurrent programming languages, it is often desirable to be able to convert a concurrent specification of a program into an equivalent sequential specification (for efficiency reasons, in order to be run on a sequential processor).

For example, real-time embedded computer systems (or more generally, reactive real-time systems) are often most effectively specified, from a functional level, in terms of a concurrent programming language. In terms of providing an executable for the embedded system, which can be executed with greater efficiency (in terms of both speed of execution and/or hardware resources), it is often most effective to provide a sequential executable that provides equivalent functionality to the current functional specification.

A very general form of concurrent programming is the specification of a concurrent control flow graph. A very general form of sequential programming is the specification of a sequential control flow graph. It is therefore desirable to have efficient procedures for converting a concurrent control flow graph into a sequential control flow graph.

A control flow graph (or CFG) is essentially a kind of flow chart, as that term is conventionally understood, that depicts the flow of control of a program as edges connecting nodes (where the nodes represent operations to be performed). Since these edges define possible flows of control, they may be referred to as "control edges." The nodes of a CFG comprise plain and conditional nodes, each with an expression. When control reaches a node, the node's expression is evaluated and control flows along one or more edges leaving the node. A plain node has a single outgoing edge and its expression is usually an assignment. Control leaves a conditional node along the edge whose label matches the value of the expression.

In a sequential CFG (or SCFG) there is only a single path of execution (or thread) through the CFG.

A concurrent CFG (or CCFG) is a CFG which also includes fork and join nodes, each of these nodes also having an expression. Fork and join nodes start and collect groups of parallel threads. Control flows out all edges leaving a fork, starting a group of threads that will wait at a matching join node before continuing. Fork and join nodes may nest, but control may not pass between threads. Specifically, all paths from a particular fork must meet for a first time at a unique join.

In addition to specifying a concurrent program in terms of a CCFG, it is often desirable to express the concurrent program in a higher-level programming language which is then translated into a CCFG. Alternatively, it may be desirable to express the concurrent program in terms of a graphical language that is then translated into a CCFG.

An example of a suitable concurrent programming language for specifying the functionality of an embedded computer system is the Esterel language. The Esterel language is described in Berry and Gonthier's "The Esterel Synchronous Programming Language: Design, Semantics and Implementation," Science of Computer Programming, volume 19 number 2 pages 87–152, November 1992 (Elsevier Science, Amsterdam, The Netherlands), which is herein incorporated by reference. This paper formally describes the semantics of the language.

Esterel has the control constructs of an imperative language like C, but includes concurrency, preemption, and a synchronous model of time like that used in synchronous digital circuits. In each clock cycle, an Esterel program restarts, reads its inputs, and determines its reaction.

FIG. 1 shows a simple Esterel program with two concurrent threads. The first thread waits for the START signal and emits REQUEST. If it receives GRANT in the same cycle, it emits the GOT signal. In alternating cycles, the other thread emits GRANT in response to REQUEST. The threads restart when the RESET signal appears because of the abort-when RESET construct inside the outer loop.

The translation of Esterel into the CCFG may be accomplished in a variety of ways. A particular translation of Esterel into a CCFG is presented herein by pairing Esterel statements with their corresponding implementation as a program fragment of "concurrent C." Concurrent C is a form of pseudo-code which is utilized in this patent for expository purposes. Concurrent C is essentially the same as standard C, with the addition statements that perform the fork and join functions. The translation of concurrent C into a CCFG can be accomplished by a variety of known methods. In this patent, Esterel statements are paired with their corresponding concurrent C program fragment, rather than with their corresponding CCFG fragment, for expository convenience.

FIGS. 2A through 2D depict the translations of the Esterel statements, that do not affect time, into concurrent C code. For each of these Figures, the Esterel statement is on the left and the concurrent C code translation is on the right.

The "exit" statement of Esterel throws an exception that can be caught by a surrounding "trap T in . . . handle T do." This only happens after all threads in the same group are done for the cycle. To handle this, each thread sets an exit level when it stops at the end of a cycle. This level indicates termination (level 0), pausing (level 1), or an exception (levels 2 and higher). Exceptions take precedence over pauses, so a group of threads responds only to the highest level.

A "pause" statement resumes in the next cycle. A pause statement is shown on the left side of FIG. 3A, with the right side depicting its translation into concurrent C. The operation of this concurrent C is as follows. The code sets its threads state to "k," making the "switch" statement surrounding the thread send control to the "case" label next cycle. Raising the exit level to 1 indicates this thread has paused. The branch to "join" stops the thread for the cycle.

The "await" statement is similar to "pause," but it also pauses in later cycles until its signal is present. An await statement is shown on the left side of FIG. 3B, with the right side depicting its translation into concurrent C.

Esterel's preemption statements, such as "abort," introduce the equivalent of nested "switch" statements in concurrent C. This is shown in FIG. 3C where an Esterel abort statement is shown on the left and is paired with its translation into concurrent C on the right side. In the first cycle, "abort" just runs its body. It restarts its body in later cycles only if the aborting signal is absent.

The Esterel "suspend" statement runs its body in the first cycle and pauses in later cycles when the suspending signal is absent, leaving its thread's state unchanged. This operation of suspend is depicted in FIG. 3D where an Esterel suspend statement is shown on the left and is paired with its translation into concurrent C on the right side.

The Esterel "signal" statement creates a new, absent copy of its signal. This operation of signal is depicted in FIG. 3E where an Esterel signal statement is shown on the left and is paired with its translation into concurrent C on the right side.

The Esterel "exit" statement raises its process's exit level to two or more depending on the exception. Since this terminates the thread and its process, there is no need to set the thread's state. This operation of exit is depicted in FIG. 3F where an Esterel exit statement is shown on the left and is paired with its translation into concurrent C on the right side.

In Esterel, "parallel" and "trap" statements are intertwined. An example of this is shown on the left side of FIG. 3G. An implicit trap surrounds each group of parallel threads, and the body of a trap is considered a separate thread. The trap/parallel combination resets the exit level for the enclosed process, runs the threads within, and handles the exit level they return. In the concurrent C translation of FIG. 3G, the process terminates if the level is zero (the switch falls through), pauses at level one, and handles exceptions at levels two and higher.

Furthermore, the concurrent C translation of the right side of FIG. 3G implements the Esterel "parallel" and "trap" statements as follows. The threads have two entry points: one taken in the first cycle, the other taken in later cycles that use "switch" statements to restart the threads. The "fork" statement passes control to each of its labels. The "join" waits until all the threads branch to it before continuing. A terminated thread sets its state to zero so control will go to the case 0: labels when other threads in the process continue to run.

In addition to the above pairings, the translation of Esterel nested abort statements into an CCFG is accomplished according to the following procedure. The following procedure also applies to the simpler situation of sequenced pause statements.

At the beginning of each clock cycle, every running Esterel thread checks the signals that might abort running blocks before resuming where it paused in the last cycle. Each CCFG thread simulates this behavior by saving its state at the end of a cycle and resuming at the beginning of the next with "switch" statements.

Nested aborts in the Esterel program are handled with nested switches in the concurrent C code. A thread's aborts form a tree with a signal at each node and a pause or group of threads at each leaf. Restarting a thread at the beginning of a cycle requires checking for abortion signals along the path from the root to the leaf that had control at the end of the last cycle.

Each node of the tree is translated into an "if" that checks the aborting signal and a "switch" that sends control to a child. The encoding of a thread's states (which corresponds to the leaves of the preemption tree) simplifies the decision at each switch. The edges leaving each node are numbered 0, 1, 2, etc. and become the "case" labels. The sequence of edge labels from the root to a leaf becomes the encoding for the leaf. These labels are packed into a single machine word so each switch statement can extract them with a mask and a shift. FIG. 4 depicts an example that illustrates state encoding with nested aborts (and sequenced pauses) on the left in Esterel and the translation into state-encoded concurrent C on the right. Code that sets exit levels (explained above) is not shown in FIG. 4.

SUMMARY OF THE INVENTION

The present invention accepts an acyclic concurrent control-flow graph and produces a sequential control flow graph that, when executed, behaves functionally like the CCFG would if it were run on concurrent hardware. An SCFG can be easily translated into a traditional sequential programming language such as C or assembly to be executed on a traditional sequential processor.

Determining the order in which CCFG nodes will be run is the first step in the process. Control edges in the CCFG constrain the order in which CCFG nodes must run; communication between threads generally impose further constraints. For example, the Esterel language requires all statements that write a variable run before any statement that reads the same variable.

An easy way to further constrain a valid order of CCFG nodes is to augment the CCFG with data dependence edges (representing inter-thread communication) and topologically sort the nodes in the augmented graph.

Once the CCFG nodes are ordered, the procedure for producing the SCFG from the scheduled acyclic CCFG simulates the execution of the CCFG under an operating system supporting concurrent threads and creates an SCFG that, when executed, will reproduce the functional behavior of the CCFG running under this simulated operating system. The effects of context switching are largely compiled away by this simulation process. Each context switch is done by a single assignment that stores the state of the thread being suspended and a single branch that restores the state of the thread being resumed.

In particular, the procedure produces the SCFG by stepping through the CCFG nodes in scheduled order, copying each node and its incoming edges to the SCFG. During this simulation, the procedure maintains a set of currently active (i.e., runnable) threads. When a node is encountered during simulation that does not reside in one of the active threads, or when two nodes in different active threads appear one after the other, the procedure adds nodes to the SCFG that perform a context switch. These save the state of a running thread and resume the thread of the current node with a multi-way branch.

The procedure handles fork and join nodes specially. These nodes represent starting and terminating groups of threads. When a fork node is encountered, a new thread is created for each of its outgoing edges. These threads begin in a suspended state, forcing a context switch whenever the first node in any of the threads is encountered. When a join node is encountered, each of its threads is terminated.

While the present invention minimizes the cost of context switches, they are still relatively expensive. Minimizing context switches through a careful choice of order is desirable, but appears to be NP-complete. Fortunately, experiments suggest a simpleminded topological sort will produce acceptably efficient schedules, although heuristic search techniques could be applied to improve schedule quality.

The present invention requires the edges in the CCFG to be acyclic to ensure that there exists an order of the nodes such that all edges are forward. This does restrict the class of systems the present invention is able to generate SCFGs for, but many useful systems have this acyclic property.

Advantages of the invention will be set forth, in part, in the description that follows and, in part, will be understood by those skilled in the art from the description or may be learned by practice of the invention. The advantages of the invention will be realized and attained by means of the elements and combinations particularly pointed out in the appended claims and equivalents.

BRIEF DESCRIPTION OF THE DRAWINGS

The accompanying drawings, that are incorporated in and constitute a part of this specification, illustrate several embodiments of the invention and, together with the description, serve to explain the principles of the invention:

FIG. 1 shows a simple Esterel program with two concurrent threads;

FIGS. 2A through 2D depict translations of Esterel statements, which do not affect time, into concurrent C code;

FIGS. 3A through 3F depict on the left, respectively, Esterel statements pause, await, abort, suspend, signal and exit; on the right FIGS. 3A through 3F depict the translation of the Figure's Esterel statement into concurrent C code;

FIG. 3G shows, on the left, the intertwined usage of Esterel trap and parallel statements, while the right side of this Figure shows the translation of such trap and parallel statements into concurrent C;

FIG. 4 depicts an example that illustrates state encoding with nested aborts (and sequenced pauses) on the left in Esterel and the translation into state-encoded concurrent C on the right;

FIG. 5 illustrates on the left an Esterel program that can execute a statement multiple times whereas the right side of FIG. 5 shows concurrent C (with the parallel operator of Esterel) which eliminates multiple execution of statements by making multiple copies of them;

FIGS. 6A through 6I show detailed pseudo-code for the translation process from a scheduled acyclic CCFG to an SCFG;

BRIEF DESCRIPTION OF THE APPENDIX

Figure 7:
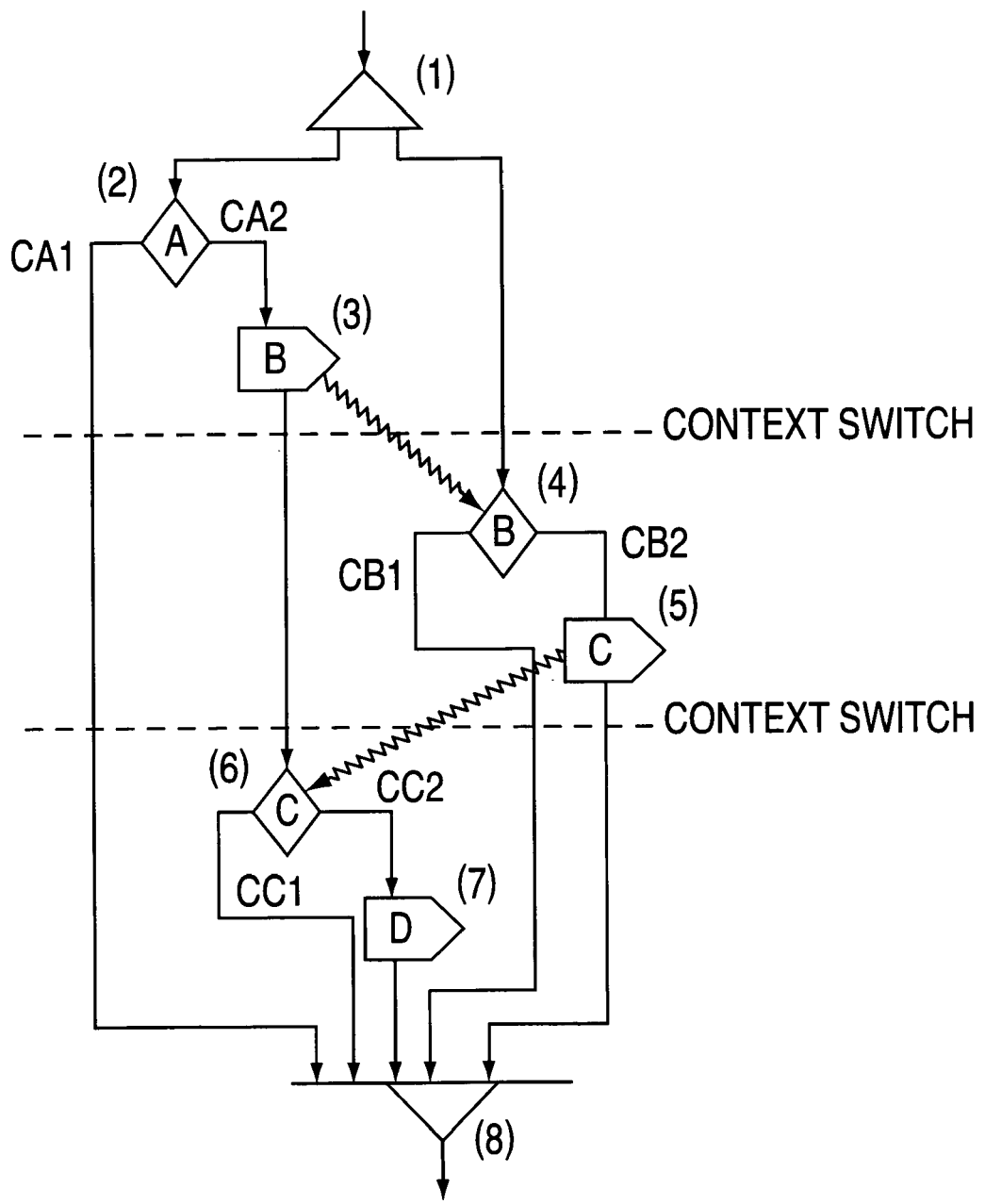
FIG. 7 presents an exemplary scheduled acyclic CCFG for input to the pseudo-code of FIG. 6.

The accompanying Appendix, that is incorporated in and constitutes a part of this specification, illustrate several embodiments of the invention and, together with the description, serve to explain the principles of the invention:

Appendix A presents the detailed step-by-step simulated execution of the pseudo-code of FIG. 6 upon the example of FIG. 7.

DETAILED DESCRIPTION OF PREFERRED EMBODIMENTS

Reference will now be made in detail to preferred embodiments of the invention, examples of which are illustrated in the accompanying drawings. Wherever possible, the same reference numbers will be used throughout the drawings to refer to the same or like parts.

The present invention accepts an acyclic CCFG as input and produces an SCFG as output. Once an SCFG has been produced, a variety of known methods can be used to translate the SCFG into a non-concurrent language (such a C or assembler) which can be sequentially executed by a computer system. The translation of an acyclic CCFG into an SCFG is accomplished as follows.

An CCFG differs from an SCFG in that it has concurrently executing threads. If these currently executing threads have no data interaction among them, then the translation from CCFG to SCFG is straightforward: the currently executing threads can be placed "end to end" in a sequential order.

If, however, there is at least one bidirectional communication, between at least two threads, then the translation from CCFG to SCFG is considerably more complex. For example, if there is a thread1 and a thread2, which are concurrently executing, and in which the following occurs: i) data produced by thread1 (a "writer"), ii) the data produced by thread1 is considered by thread2 (a "reader"), iii) data is then produced by thread2 (now thread2 is a "writer") and iv) the data produced by thread2 is considered by thread1 (thread1 is now a "reader").

Scheduling the nodes in the CCFG is the first step in producing a SCFG from it. A schedule is a total order on the nodes. Technically, for each pair of nodes, one is considered "earlier," the other "later." A typical way to describe this total order is to give each node a small integer label. For example, the first node is labeled 1, the second 2, and so forth.

The present invention requires the nodes in the CCFG to be ordered such that every control edge is forward, that is, if there is an edge between two nodes, the source node is earlier than then destination node. The communication semantics of the source language usually imposes additional constraints on the order. For example, to implement Esterel semantics, a data edge can be added leading from each node that writes a variable to each node that reads the same variable.

One way to further constrain a valid order for the nodes is to augment the CCFG (which has thus far been presented as only containing control edges) with data dependency edges (or simply "data edges") representing communication constraints and topologically sort the augmented graph. As with a control edge, no data edge passes from a node with a later number in the order to a node with an earlier number in the order. For example, to implement Esterel semantics, a data edge can be added leading from each node that writes a variable to each node that reads the same variable. FIG. 7 depicts a scheduled ACCFG where each node has already been assigned an integer (from 1 to 8) to indicate its location within the order. All the of the edges in FIG. 7, depicted with straight lines, are control edges. There are two edges in FIG. 7, specifically the edge from node 3 representing the statement "emit B" to node 4 representing the statement "conditional B" and the edge from node 5 representing the statement "emit C" to node 6 representing the statement "conditional C," that depict data edges. As can be seen, these two data edges are distinguished by being drawn with jagged lines.

A topological sort of an augmented CCFG is one way to determine a valid ordering (or scheduling) of the nodes in a CCFG. This well-known procedure recursively visits each node in the graph and adds the node to the beginning of the topological order after visiting all of the node's successor nodes. The resulting order can easily be shown to have the property mentioned above, that is, every edge in the CCFG will lead from an earlier node to a later one.

Whenever a node from one thread is followed immediately by a node from another thread, the present invention produces a relatively expensive context switch in the SCFG. Minimizing these context switches is desirable, but appears to be an NP-complete problem (it is as hard as the minimum feedback vertex set problem). Experiments suggest that using a topological sort to order nodes produces orders with acceptable numbers of context switches. However, heuristic search techniques could be applied to further reduce their number.

The present invention requires the edges in the CCFG to be acyclic to ensure that there exists an order of the nodes such that all edges are forward. This does restrict the class of systems the present invention is able to generate SCFGs for, but many useful systems have this acyclic property.

The translation of Esterel programs described in the background section occasionally produces cyclic CCFGs for Esterel programs that should have a sequential implementation. The cycles in these CCFGs can be removed using a procedure based on the one described by Gerard Berry in "The Constructive Semantics of Esterel," a book in preparation available at www-sop.inria.fr/esterel.org, and herein incorporated by reference. Berry's procedure was originally designed to cure a similar problem that arises when Esterel is translated into a circuit netlist as in his V4 and V5 compilers. The V4 and V5 compilers are described in the Gerard Berry book, as well as in "Esterel on hardware," by Gerard Berry, Philosophical Transactions of the Royal Society of London, Series A, 339:87–104, 1992, that is herein incorporated by reference.

The example in FIG. 5 shows an Esterel fragment that produces a cyclic CCFG when translated using the procedure described earlier. The problem comes from the "present" statement, which can run twice in a cycle. When "exit T" runs, it terminates the trap, causing the outer loop to immediately restart the threads. This causes "present A" to run again. The right side of FIG. 5 shows how this problem can be dealt with by making a separate copy of each invocation of the present statement.

In fact, it is possible to write an Esterel program that executes certain statements many times within a single cycle. All are roughly of the form shown in FIG. 5. The problem arises when the first block of code within a trap within a loop can be interrupted and restarted within the same cycle. The cycle involves the code that handles exceptions, which appears to be able to send control back around the loop indefinitely. However, the Esterel language requires that all loops must pause for at least one cycle, so this cyclic control path can only be taken a finite number of times within a cycle. The solution is to duplicate the first block of code, which is guaranteed not to instantaneously terminate and restart itself. The result of such duplication is shown in the right side of FIG. 5.

The cycle of FIG. 5 is a side effect of Esterel semantics and may not appear in other languages. The procedure for unrolling these cycles is specific to Esterel and may not be applicable to other programming languages.

Certain Esterel programs cannot be converted into an acyclic CCFG, and can only be expressed as a cyclic CCFG. These include programs where the required order of execution of two or more statements may change depending upon the particular data to be processed. For example, there can be a statement1 in a thread1 of an Esterel program and a statement2 in a concurrently running thread2 of the same Esterel program. Such a program may have the required order of execution of statement1 and statement2 change depending upon the data to be processed.

Although the present invention has many uses, one possible use is as one of a series of steps that together translate Esterel into sequential C code. For example, a translation might begin by translating Esterel into a possibly cyclic CCFG using the procedure described in the background section. Next, any cycles in the CCFG are removed by the procedure discussed above that duplicates nodes in the CCFG. Once the CCFG is acyclic, it is passed to the present invention, along with an ordering for the nodes, which then generates an SCFG. As mentioned above, if scheduling is included as a step of the present invention, any one of a variety of scheduling approaches could be used, including the topological sort procedure described above or a heuristic scheduler. Finally, the following simple procedure can be used to translate the SCFG into a conventional sequential code (such as C or assembler): order the nodes in the SCFG, generate code for each, and place goto statements where necessary to produce the needed flow of control. Any of the steps surrounding the invention could be modified significantly to accommodate a different language, different mechanisms for removing cycles, and so forth, without change to the invention.

The present invention is also described in the following paper: Stephen Edwards, "Compiling Esterel into Sequential Code," Proceedings of the $7^{th}$ International Workshop on Hardware/Software Codesign, Rome, Italy, May 3–5, 1999, pages 147–151, published by the Association for Computing Machinery, herein incorporated by reference. This paper includes a discussion of a variant of the CCFG presented here.

The translation process, from a scheduled acyclic CCFG to an SCFG, is described, in detail, in the pseudo-code of FIG. 6. The pseudo-code of FIG. 6 is loosely based on the C and C++ programming languages.

An exemplary scheduled acyclic CCFG is depicted in FIG. 7.

The simulated execution of the pseudo-code of FIG. 6, upon the example CCFG of FIG. 7, is depicted in FIG. 8 and is also described in Appendix A.

Before discussing the detailed procedure of FIG. 6, it is useful to present a general overview of it. In general, the procedure for producing the SCFG from the scheduled acyclic CCFG is as follows. Each node of the CCFG is looped over, in scheduled order, such that it becomes the "current node" (or "cn"). A copy of the current node is produced for the SCFG, called the "current SCFG node" (or "sn"). If the thread in which the current node resides is suspended and not currently running, a context switch is inserted between the nodes in the SCFG representing the previously-running thread and the current SCFG node. Regardless of whether the thread of the current node is running or not, edges to the current SCFG node are added, such edges leading from the current node's predecessors in the SCFG and reflecting the current SCFG node's placement within its thread which must now be running. This process is also depicted as a flowchart in FIG. 10.

A context switch consists of two parts: nodes that save the state of the thread that was executing previously (that is, the one being suspended), and a conditional node (a "restart node") that tests the saved state of the node being resumed (that is, the thread in which the current node resides). This state was saved by the assignment nodes of a previous context switch when the thread was suspended. The conditional node branches to the current SCFG node if the saved state of the thread matches the ID of the node (usually the number of the current node in the schedule), indicating that the current node was about to run when its thread was last suspended. Once the context switch has been inserted, subsequent current SCFG nodes may also represent additional continuation points of the thread just resumed (provided there is no intervening context switch) and each of these continuation points will also be branched to, based on the previously-saved state, from the same restart node.

As discussed above, context-switching code in the SCFG saves the state of suspended threads in state variables. It should be noted that the procedure of the present invention for constructing the SCFG manipulates the names of these variables, but not their values. The values of these variables are only needed when the SCFG is running, after it has been generated.

Figure 10:
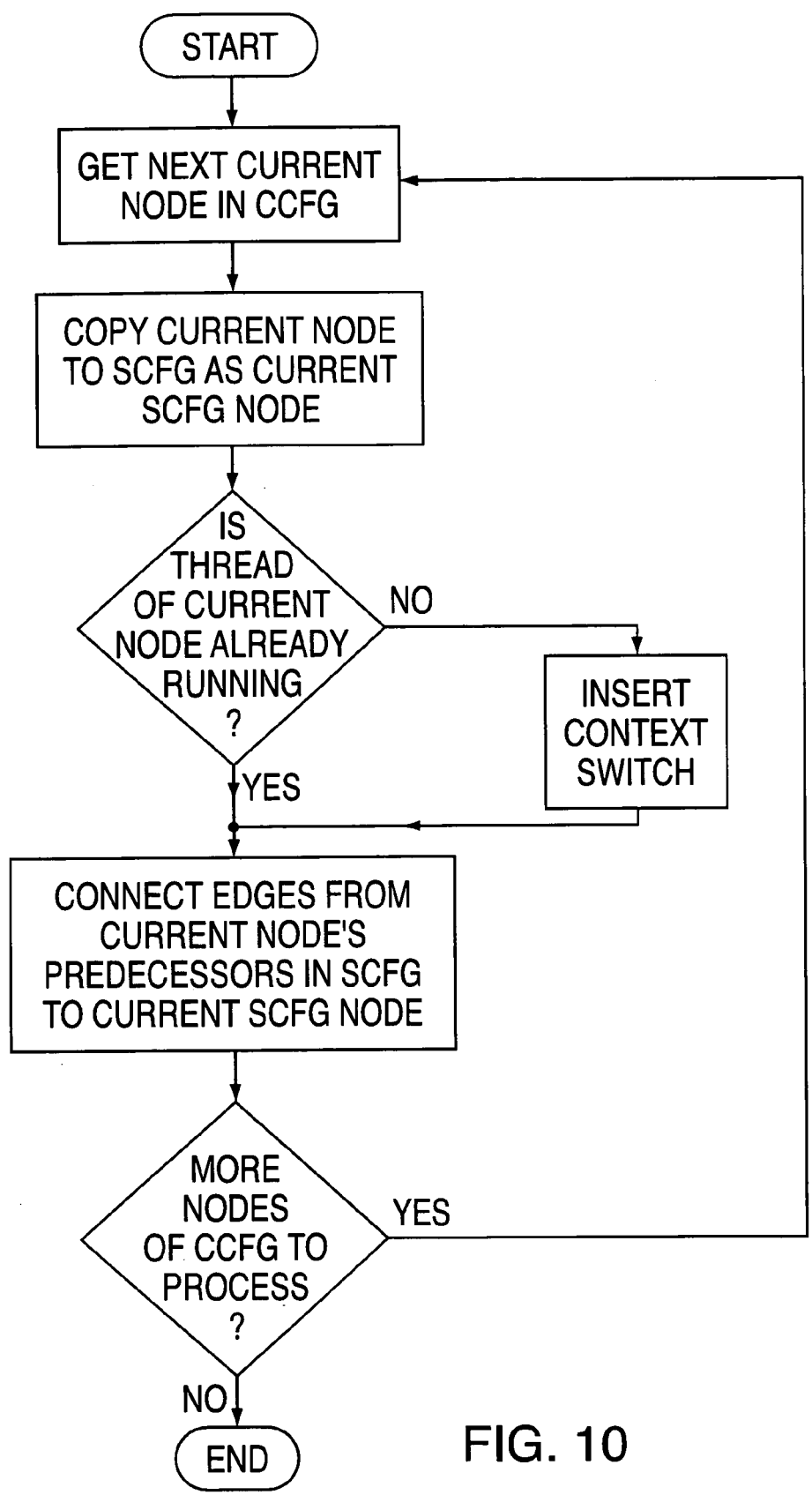
FIG. 10 depicts an overview flowchart of the CCFG to SCFG conversion process.

Subsequent to the process of FIG. 10, the resulting SCFG is typically translated, by known techniques, into a programming language description reflecting the SCFG's sequential thread of control. This programming language description is then, typically, transferred to the target architecture of an embedded system which executes it. The SCFG resulting from the process of FIG. 10 may be executed in other ways as well. For example, the SCFG could be interpreted directly.

1. Pseudo-Code Description

The pseudo-code of FIG. 6 is structured as follows.

The main data types of an ACCFG are: cnode, process and thread. The main data type of the SCFG is the snode. Each snode has an expression that is usually copied from its counterpart in the CCFG and a set of outgoing edges, each of which may have a label. FIG. 6A defines the cnode data type, while FIG. 6B defines the process and thread data types.

A cnode represents all nodes of the ACCFG. For example, each node of the exemplary ACCFG of FIG. 7 would be represented by a cnode data structure. In the process of converting the ACCFG into an SCFG, the input ACCFG is augmented with the additional data structures of the process and thread. A process is defined as a class extension of the cnode class and therefore inherits its properties. In the course of converting the ACCFG into an SCFG, a process is created each time a fork node is encountered in the ACCFG. The basic purpose of the process is to contain, and keep track of, the plurality of concurrent threads which the fork node starts. Each of these concurrent threads is represented by the thread data structure and these thread data structures are placed within the process data structure representing the fork node which started the thread.

FIGS. 6C through 6E depict the main routine for converting an ACCFG into an SCFG. This routine is entitled "synthesize a scfg" and it produces an SCFG as output when given a scheduled ACCFG as input. In particular, "synthesize a scfg" produces an SCFG which has a single entry node (the first node to be executed in the SCFG) and a single exit node (the last node to be executed in the SCFG). The procedure expects the ACCFG to have a single exit node, which will become the SCFG exit node.

FIG. 6C depicts the block of initialization assignment statements which create the initial process and thread data structures by which conversion of the ACCFG into an SCFG can begin. Specifically, an outermost process (called "op") is created. FIG. 6C, line 12. This is the only process which does not correspond to any fork node. Within the outermost process the outermost thread (called "tt") is created. The single entry node for the SCFG (called "en") is created. FIG. 6C, line 10. Also, the first scheduled node of the input ACCFG (obtained at FIG. 6C, line 32) is put in the outermost thread. FIG. 6C, lines 37 and 39.

The main loop of "synthesize a scfg" begins at FIG. 6D. The main "for" loop iterates over each cnode of the input ACCFG, in scheduled order. FIG. 6D, line 4. Specifically, each cnode of the input ACCFG becomes the current cnode and is assigned to the variable "cn." The first action of the main loop is to make an snode copy of the current cnode for the SCFG graph. FIG. 6D, line 6. This snode copy of the current cnode is called the current snode and is assigned to the variable "sn." Next, the thread in which the current cnode is contained is determined. FIG. 6D, line 7. Note that for the very first scheduled cnode of the ACCFG, the initialization code of FIG. 6C has already placed it within the outermost thread.

The rest of the body of the main loop is divided into four main code blocks labeled A, B, C and D. Code blocks A and B are shown in FIG. 6D, while code blocks C and D are shown in FIG. 6E. For each current cnode, a code block from A or B, and a code block from C or D is executed. Specifically, for a fork node code blocks B and C are executed. For a join node code blocks A and D are executed. For all other current cnodes (also referred to as "normal" cnodes), code blocks B and D are executed. This execution of code blocks can be viewed as follows. Usually, for normal cnodes, code blocks B and D are performed. When a fork is encountered, the same code blocks are executed as for a normal cnode, except that code block C is substituted for code block D. Similarly, when a join is encountered, the same code blocks are executed as for a normal cnode, except that code block A is substituted for code block B. This execution of code blocks depending upon cnode type is depicted in tabular form in the comments of FIG. 6D at lines 16–18.

FIGS. 6F through 6I depict the support functions for "synthesize a scfg." Specifically, FIG. 6F depicts the support functions "run cnode cn as snode sn" and "put cnode cns in thread th." The input parameters to "run cnode cn as snode sn" are "cn" to which a cnode is passed and "sn" to which an snode is passed. The input parameters to "put cnode cns in thread th" are "cns" to which a cnode is passed and "th" to which a thread is passed. FIG. 6G depicts the support function "switch to thread th." The input parameter to "switch to thread th" is "th" to which a thread is passed. FIGS. 6H and 6I show the support function "suspend any running thread in process p." The input parameter to "suspend any running thread in process p" is "p" to which a process is passed.

2. Simulated Execution of Pseudo-Code

The simulated execution of the pseudo-code of FIG. 6, upon the input ACCFG example of FIG. 7, is discussed below. It should be noted that this simulated execution of the pseudo-code of FIG. 6 is not the simulation objective of the pseudo-code itself. Once the pseudo-code of FIG. 6 is translated into actual code, execution of the actual code results in simulating (as discussed above in the Summary of the Invention) the execution of the input CCFG under an operating system supporting concurrent threads.

Appendix A presents a step-by-step pseudo-code listing of the simulated execution of the pseudo-code of FIG. 6 upon the example of FIG. 7. In conjunction with Appendix A, FIG. 8 presents, graphically, the simulated execution of the example of FIG. 7 on the pseudo-code of FIG. 6. While Appendix A and FIG. 8 are detailed, they are not exhaustive presentations of every simulated step of execution of the pseudo-code of FIG. 6.

The underlined headings of Appendix A denote the execution of certain key code blocks of FIG. 6, or the entry of certain key functions of FIG. 6.

Appendix A begins with the heading "synthesize a scfg" indicating that the pseudo-code function "synthesize a scfg" has been called (FIG. 6C, line 4) with the ACCFG of FIG. 7 as its input parameter.

2.1 Initialization

The next heading of Appendix A is "Initialization." This indicates the execution of the block of pseudo-code statements, within "synthesize a scfg," that are titled with the comment "INITIALIZATION." FIG. 6C, lines 6-41. Immediately below the Appendix A heading "Initialization," is a comment stating "See FIG. 8A." This comment indicates that from its point forward in Appendix A, until the reference to "See FIG. 8B" is reached, the step-by-step execution of Appendix A should be viewed in conjunction with the graphical illustration of FIG. 8A.

In general, the function of the "INITIALIZATION" block of pseudo-code statements is to set up the outermost process and put a single outermost thread within it. This outermost thread starts out suspended. The execution of the first iteration of the "MAIN LOOP" (discussed below) will resume this outermost thread such that the topologically first node of the input ACCFG can be converted into the output SCFG. The step-by-step execution of the "INITIALIZATION" block, upon the particular example of FIG. 7, is presented below.

As can be seen in Appendix A, the first action under the "Initialization" heading is the creation of an entry node (called "en") for the SCFG being created with the node being assigned the number 1003.

Next, the outermost process (called "op" and indicated by the number 1000) is created.

Subsequent to creating process 1000, as can be seen in Appendix A, this process is referred to in the listing of Appendix A as "process_1000." The statement "process_1000.state=Runnable" indicates that the "state" property of process_1000 is being assigned the value "Runnable." Setting the state of process_1000 to "Runnable" indicates that process_1000 can run one of the threads of control it contains, but that currently none of its contained threads is running.

The "runningThread" property of process_1000 is set to "none" since there is no thread inside it currently running.

Next, entry node 1003 is added to the "runningPredecessors" of process_1000, and the pointer from process_1000 to entry node 1003 is given the "empty" label. This is accomplished by the pseudo-code of FIG. 6C, lines 18-20. Note that the "+=" operator means, in general, that the item on the right-hand-side of the operator is being "added" to the collection of like items on the left-hand-side of the operator. In this particular case, the "+=" operator means that process_1000 could point to multiple nodes as being among its runningPredecessors. The expression on the right-hand-side of the "+=" operator of FIG. 6C, line 18, namely "(en, -)", indicates both what node process_1000 points to, by way of pointer 1065, and the label to be associated with the pointer 1065. In general, for an expression "(<leftarg>, <rightarg>)," the argument <leftarg> specifies the node to be pointed to while <rightarg> specifies the label for the pointer. If <rightarg> is a hyphen (i.e., "-"), then the empty label is specified.

In general, the values of labels are only compared when attached to the outgoing pointer from a conditional node. For conditional nodes, the label indicates that the pointer (also known as "edge") it is associated with should be taken when the expression of the conditional node evaluates to the value specified by the label. If the label of a pointer is empty, then that pointer becomes the default pointer of the conditional node it originates from. The default pointer from a conditional node is taken if none of the other pointers from the conditional node, all with non-empty labels, match the value of the conditional node's expression.

Figure 8A:
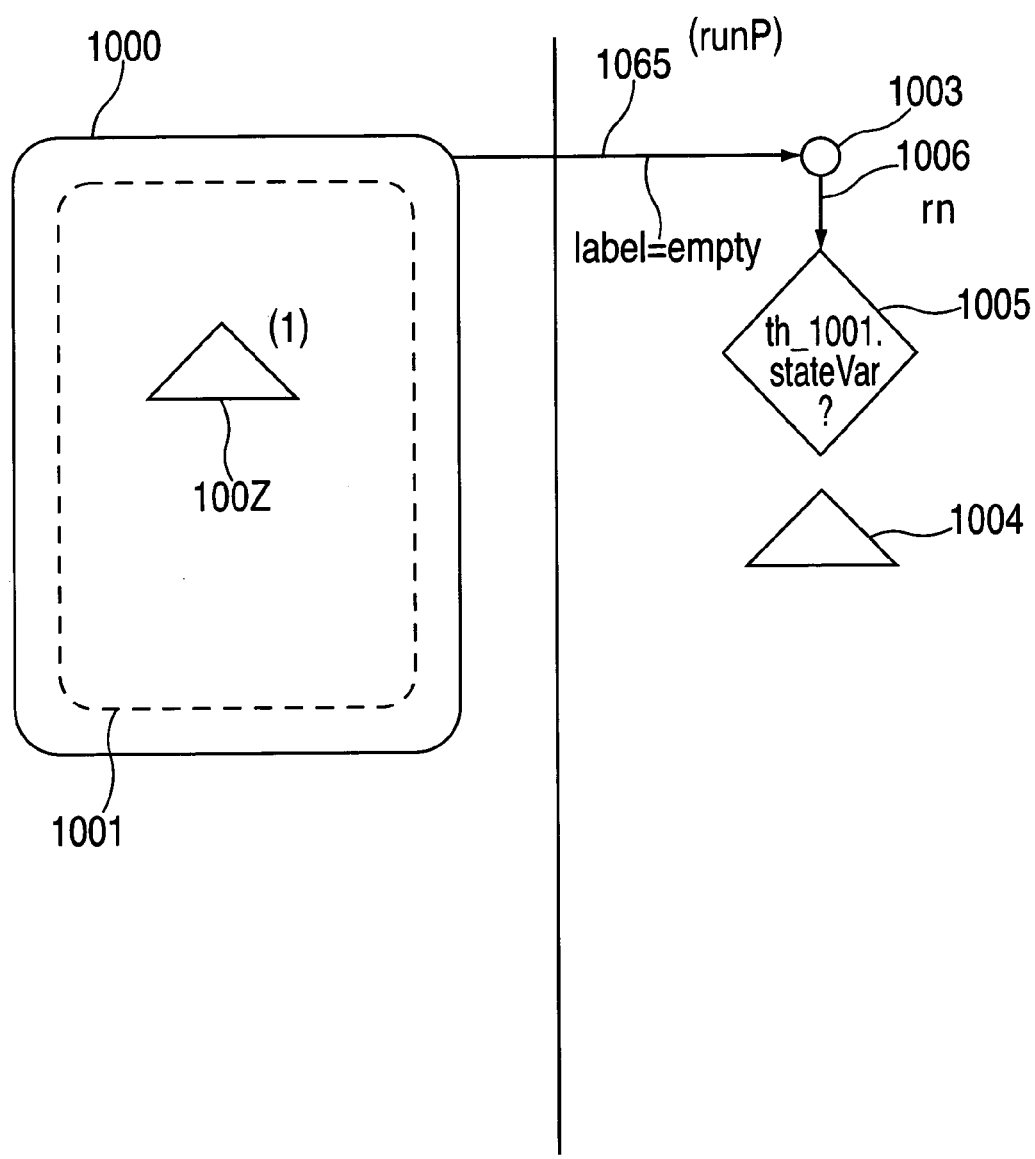
FIGS. 8A through 8N and 8P through 8Q (there is no FIG. 8O) depict the simulated execution of the pseudo-code of FIG. 6, upon the example CCFG of FIG. 7.

In FIG. 8A, pointer (or edge) 1065 has its empty label indicated by the expression "label=empty." In FIG. 8, an alternative way of denoting an edge as having an empty label is to provide the edge with no label indication. Edge 1065 has been provided with the abbreviation "runP" to indicate that it points to a "runningPredecessor" of process 1000. In general, the use of the abbreviation "runP" in FIG. 8 indicates that the edge points to a runningPredecessor. Similarly, other edges in FIG. 8 have the abbreviation "resP" which indicates that the edge points to a "restartPredecessor."

At this point it is worth noting that in FIGS. 7 and 8, for edges emanating from conditional nodes, each edge's non-empty label value is simply written next to the edge (rather than being written in the form "label=edge's_label_value"). This alternative notation indicates that, during the course of execution of the SCFG, whether that edge is taken is determined by the edge's label value. In contrast, runningPredecessor and restartPredecessor edges, when a non-empty label value is to be indicated, always have the label value specified by an expression of the form "label=edge's_label_value."

The next step of "Initialization" in Appendix A is the creation of the outermost thread 1001. FIG. 6C, line 26. Then thread 1001 is added to the threads of process 1000 (FIG. 6C, line 28) and process 1000 is indicated to be the containing process of thread 1001 (FIG. 6C, line 30).

Next, the first node of the ACCFG, "fork(1)_1002," is obtained. The "1" in "fork(1)_1002" indicates the node's order in the topological sort of the ACCFG, while the "1002" indicates the node's utilization within the processes and/or threads of FIG. 8.

The name of the "stateVariable" for thread 1001, as it is to be used in the SCFG, is created. (FIG. 6C, line 35) In general, the stateVariable of a thread is a variable used when the SCFG is running that holds the state of the thread when it is suspended.

fork(1)_1002 is added to the "cnodes" of thread 1001. In general, the cnodes of a thread are the nodes of it that are either currently executing or could be executed next.

Thread 1001 is added to the "pthreads" of fork(1)_1002. "pthreads" indicates the threads to which a cnode belongs and are therefore the cnode's "parent threads." As indicated in FIG. 6A, lines 9–11, most cnodes belong to exactly one thread. The two exceptions are: the outermost process (which belongs to no threads) and a join node (which belongs to every thread it joins). While not depicted in Appendix A, it is line 22 of FIG. 6C which sets the "pthreads" of the outermost process to empty.

Finally, "Initialization" sets the "state" of fork(1)_1002 to "Suspended."

2.2 Iteration 1

Appendix A continues with the heading "1. Main Loop: First Iteration," which indicates that the first iteration of the main loop is begun next. FIG. 6D, line 4.

In general, the first iteration is responsible for converting the topologically first node of the input ACCFG into an SCFG node that is properly connected within the SCFG. The first iteration accomplishes this by "resuming" (the outermost thread is not actually being resumed since it was never previously suspended but was created as suspended by the initialization code) the outermost thread. Whenever a thread is resumed, a restart node is created to test the saved state of the thread being resumed. Since the outermost thread was not actually suspended a trivial restart node (a restart node with only one outgoing edge) is created. Such trivial restart nodes are typically removed when sequential code (such as assembler or the C programming language) is generated from the final SCFG.

In the first iteration, current node "cn" is set to fork(1) (also known as fork(1)_1002). The "1" in the heading indicates the fact of the first MAIN LOOP iteration being performed. All the subsequent headings, that are also indicative of first iteration's execution, are also prefixed with "1." As each major block of code, or each support function, within the first iteration is executed, the "1" is suffixed with additional indicators. For example, since iteration 1 is for a fork node, code blocks B and C are executed. As can be seen, all of the headings within iteration 1 have the "1" suffixed with a "b" (if they represent execution within code block B) or a "c" (if they represent execution within code block C). To illustrate how support functions are indicated in the headings, consider how code block B calls two support functions: "switch to thread th" (FIG. 6D, line 33) and "run cnode cn as snode sn" (FIG. 6D, line 34). Under the headings of "1.b" when the function "switch to thread th" is called, ".switchTT" is suffixed onto "1.b" and the resulting heading, "1.b.switchTT," is indented to indicate a nesting in the pseudo-code's flow of control. Similarly, ".runCAS" is suffixed onto a heading when "run cnode cn as snode sn" is called. Note that since "switch to thread th" calls "run cnode cn as snode sn" as part of its own execution (FIG. 6G, line 27), within the indented heading "1.b.switchTT" is the further indented heading "1.b.switchTT.runCAS."

Under the heading "1. Main Loop: First Iteration," once cn has been assigned the current node of fork(1)_1002, the next to actions are to: i) copy the current node for SCFG, creating current SCFG node 1004 which is assigned to sn (See FIG. 8A and FIG. 6D, line 6), and ii) obtain the "first" parent thread 1001 to which cn belongs and assign it to th (See FIG. 8A and FIG. 6D, line 7). For the purposes of the present presentation of pseudo-code simulation, obtaining the "first" parent thread will be defined as obtaining the first parent thread assigned to the cnode of cn. In general, however, any parent thread of the cnode of cn could be obtained and the pseudo-code of FIG. 6 would still function correctly.

Since cn is a fork node, code block B is executed next.

The first action of code block B is to call "switch to thread th" with the parameter "th" having been assigned thread_1001. "switch to thread th" operates according to one of the three following scenarios. Before describing these scenarios, it is useful to define the thread "th," that is passed to "switch to thread th," as "thread X," and it is useful to define the process containing thread X as "process Y." Under the first scenario, if thread X is already running, when it is passed as a parameter to "switch to thread th," then "switch to thread th" does nothing. Under the second scenario, if no thread in process Y is running, when thread X is passed as a parameter, then "switch to thread th" creates a restart node for resuming thread X. For the third scenario, if a thread other than X is running in process Y, when thread X is passed as a parameter, then "switch to thread th" first suspends the currently running thread (by calling "suspend any thread running in p") and then, like scenario two, creates a restart node for resuming thread X. In addition to these three basic modes of operation (or scenarios), "switch to thread th" may call itself recursively to insure that higher-level threads, that contain process Y, are also running. FIG. 6G, lines 7–10. Note that in the recursive call of "switch to thread th.process.pthreads" the parameter "th.process.pthreads" is specifying only the single parent thread of process Y since, in general, a process can only have one parent thread.

In the case of iteration 1, scenario two is applicable to "switch to thread th." Therefore a restart node 1005 is created for "resuming" thread 1001. Restart node 1005 tests the state of "thread_1001.stateVariable." This is accomplished by the pseudo-code of FIG. 6G, line 22. In FIG. 8A, "thread_1001.stateVariable" has been abbreviated as "th_1001.stateVar." Like abbreviations are done throughout FIG. 8 for the other restart nodes. In addition to creating the restart node 1005, "switch to thread th" also calls "run cnode p as snode rn" which creates the necessary inbound edges to the restart node in the SCFG. In this particular case, edge 1006 is created. Once "run cnode p as snode rn" has been run, FIG. 8A is no longer applicable since edge 1065 is removed by "run cnode p as snode rn." The continued execution of "switch to thread th" is therefore understood by reference to FIG. 8B.

Once the execution of "switch to thread th" has completed, code block B next calls "run cnode cn as snode sn." FIG. 6D, line 34. This invocation of "run cnode cn as snode sn" creates the correct inbound edges to node 1004 from the rest of the SCFG. In this particular case, the invocation creates the edge 1066 from the restart node with a label of "1." Although the value of thread_1001.stateVariable will not be set when control reaches this restart node when the SCFG is running, edge 1066 will always be taken since it is the only outgoing edge from node 1005. In general, conditional nodes with only one outgoing edge are optimized away.

Since fork(1)_1002 has been "run" (i.e., all the inbound edges to its SCFG equivalent, node 1004, have been created), code block B concludes by removing fork(1)_1002 from thread 1001. Therefore, the continued execution of iteration 1 should be viewed in conjunction with FIG. 8C.

Code block C of iteration 1 is executed next. As discussed above, code block C is only executed for fork nodes. In general, code block C does the following. It creates a process for the fork node. FIG. 6E, line 3. It creates a thread for each outgoing edge of the fork node (FIG. 6E, line 13) and each such thread is put in the fork's process (FIG. 6E, line 14). The destination node of each of the fork's outgoing edges is added to the appropriate newly created thread. FIG. 6E, lines 18–19. The process for the fork starts out runnable (FIG. 6E, line 4), but all of its threads are suspended (FIG. 6E, line 5). The next iteration of the main loop, which makes a destination node of one of the fork's outgoing edges the current node, will resume the appropriate thread of the fork's process.

For the specific example of FIG. 7, under the heading of "1.c" of Appendix A, the following occurs. A process 1008 is created for fork(1). For successor conditional_A(2)_1016 a new thread 1009 is created. For successor conditional_B (4)_1017 a new thread 1010 is created. Process 1008, thread 1009 and thread 1010 are all depicted in FIG. 8C.

2.3 Iteration 2

For the specific example of FIG. 7, under the heading of "2." of Appendix A, the actions of the MAIN LOOP can be summarized as follows. The second node of the topological ordering, conditional_A(2)_1016 is "run" (meaning that, after it is copied to the SCFG, its SCFG node has the correct inbound edges connected to it). This entails resuming the thread containing conditional_A(2)_1016, thread 1009, which therefore entails the creation of another trivial restart node (node 1012). The restart node 1012 is trivial (i.e., has only one outbound edge) because thread 1009 was never previously suspended, but this lack of distinction between previously and non-previously suspended threads simplifies the pseudo-code of FIG. 6.

The step-by-step operation of the second iteration is as follows.

As with iteration 1, the first three actions are to: i) make conditional_A(2)_1016 the current node "cn"; ii) make a current SCFG node 1001 that is a copy of conditional_A(2)_1016; and iii) obtain the parent thread 1009 containing current node conditional_A(2)_1016.

As with fork(1)_1002, the next step is to execute code block B since a conditional node is a "normal" node.

The first step of code block B is to execute "switch to thread thread_1009."

Since thread_1009 is not the outermost thread, the first action of "switch to thread" is to recursively call itself, with outermost thread_1001 as the input parameter. This recursive call to "switch to thread" (under the heading "2.b.switchTT.switchTT" of Appendix A) verifies that thread_1001 is already running and returns.

Next, "switch to thread thread_1009" performs scenario 2 by creating a restart node 1012 which tests the state of "thread_1009.stateVariable." "switch to thread thread_1009" also creates the correct inbound edge to restart node 1012 by calling "run cnode process_1008 as snode rn_1012" (as can be seen under the heading "2.b.switchT-T.runCAS" of Appendix A). Once this invocation of "run cnode process_1008 as snode rn_1012" has completed, it is appropriate to consider the further execution of "switch to thread thread_1009" in conjunction with FIG. 8D.

The main remaining actions of "switch to thread thread_1009" are as follows. Restart node 1012 is established as the restartPredecessor of conditional_A(2)_1016 and thread_1009 is set to be the "Running" thread within process_1008.

The second function call of code block B, "run cnode conditional_A(2)_1016 as snode sn_1011." This "running" of sn_1011 (the node in the SCFG that represents conditional_A(2)_1016 of the ACCFG) causes the correct inbound edge to sn_1011 (edge 1018) to be created. Note that edge 1018 has the label "2." While this label would seem to indicate that the state variable for thread_1009 (i.e., thread_1009.stateVariable) must be initialized to the value "2" when the SCFG is executed to enable edge 1018 to be taken, since 1018 is the only edge it will always be taken regardless of the value of state variable.

Finally, code block B removes conditional_A(2)_1016 from thread_1009 since it has been converted into the SCFG.

Figure 8B:
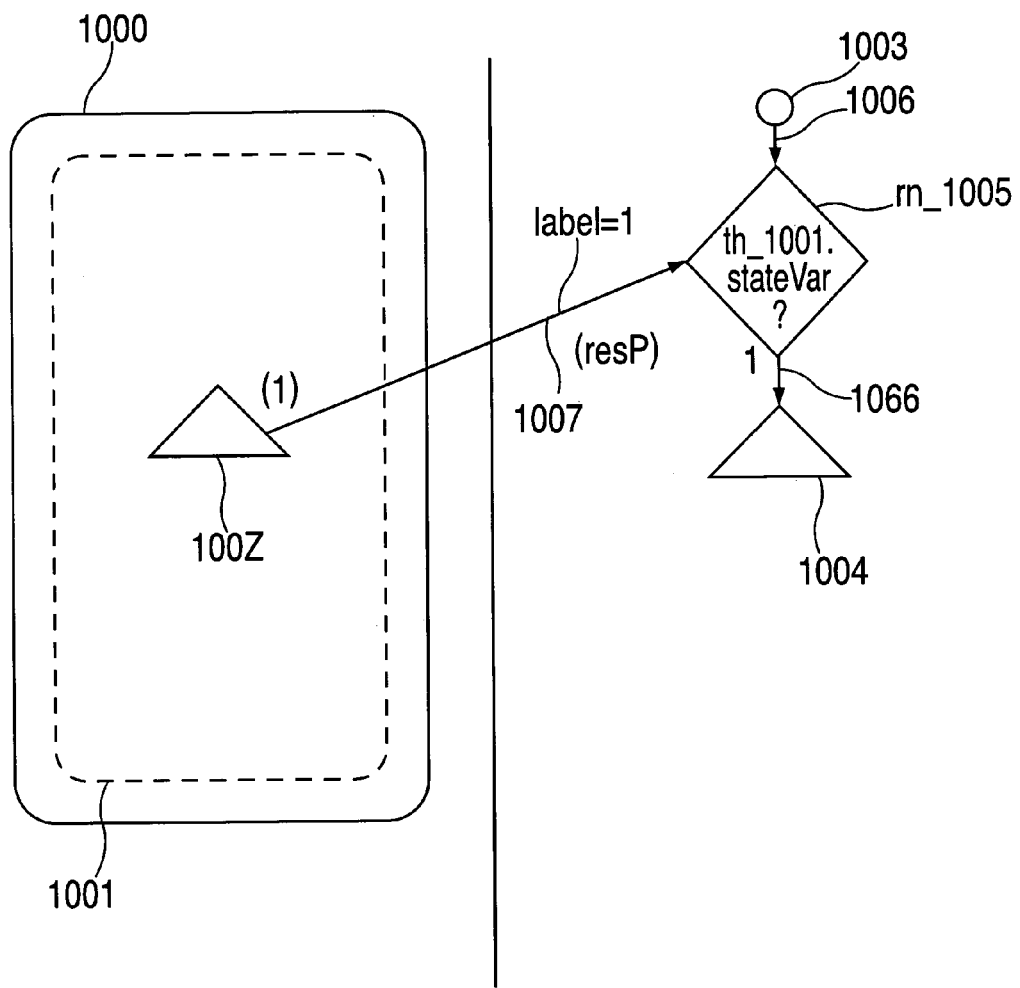
Figure 8C:
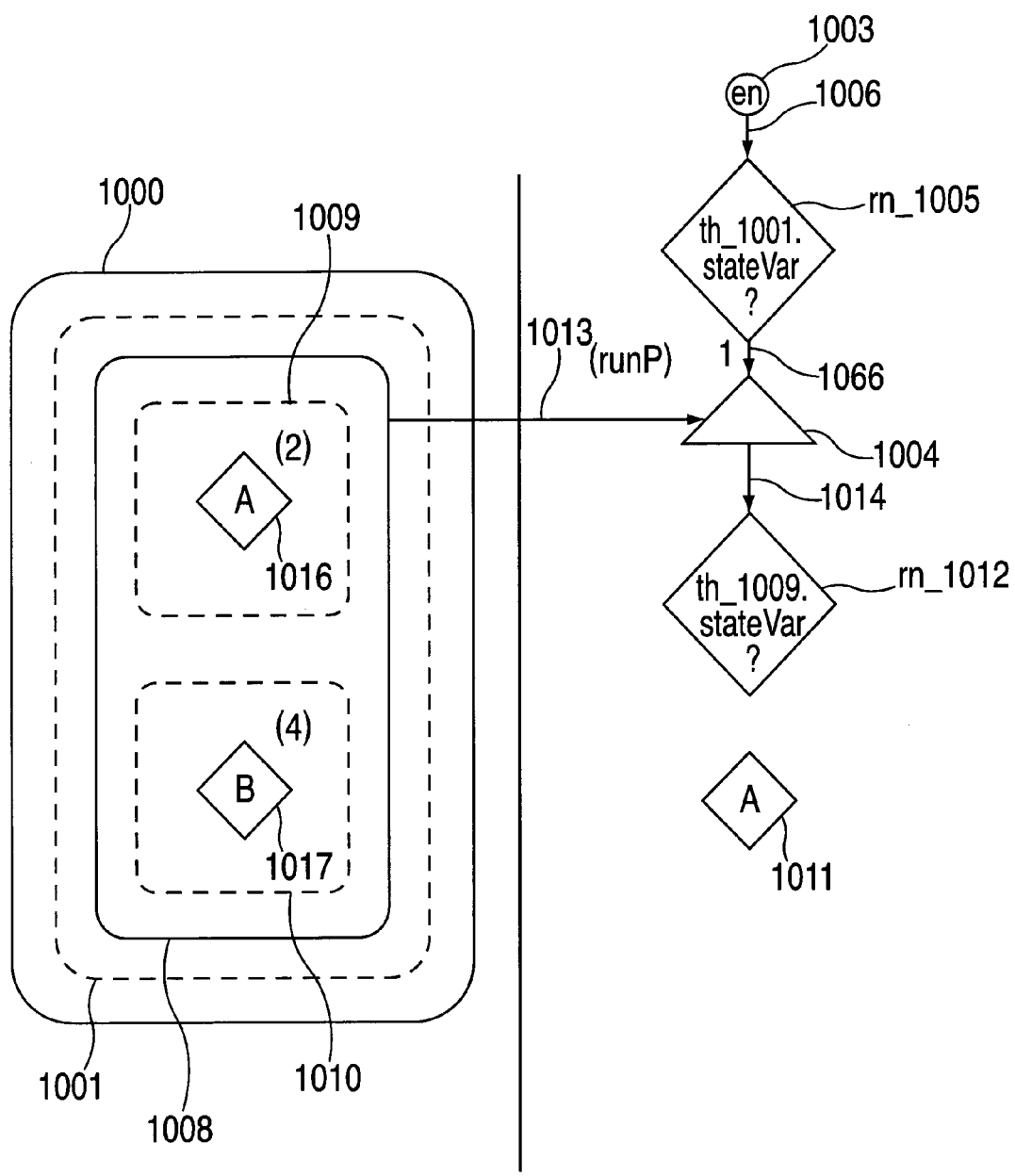
Figure 8D:
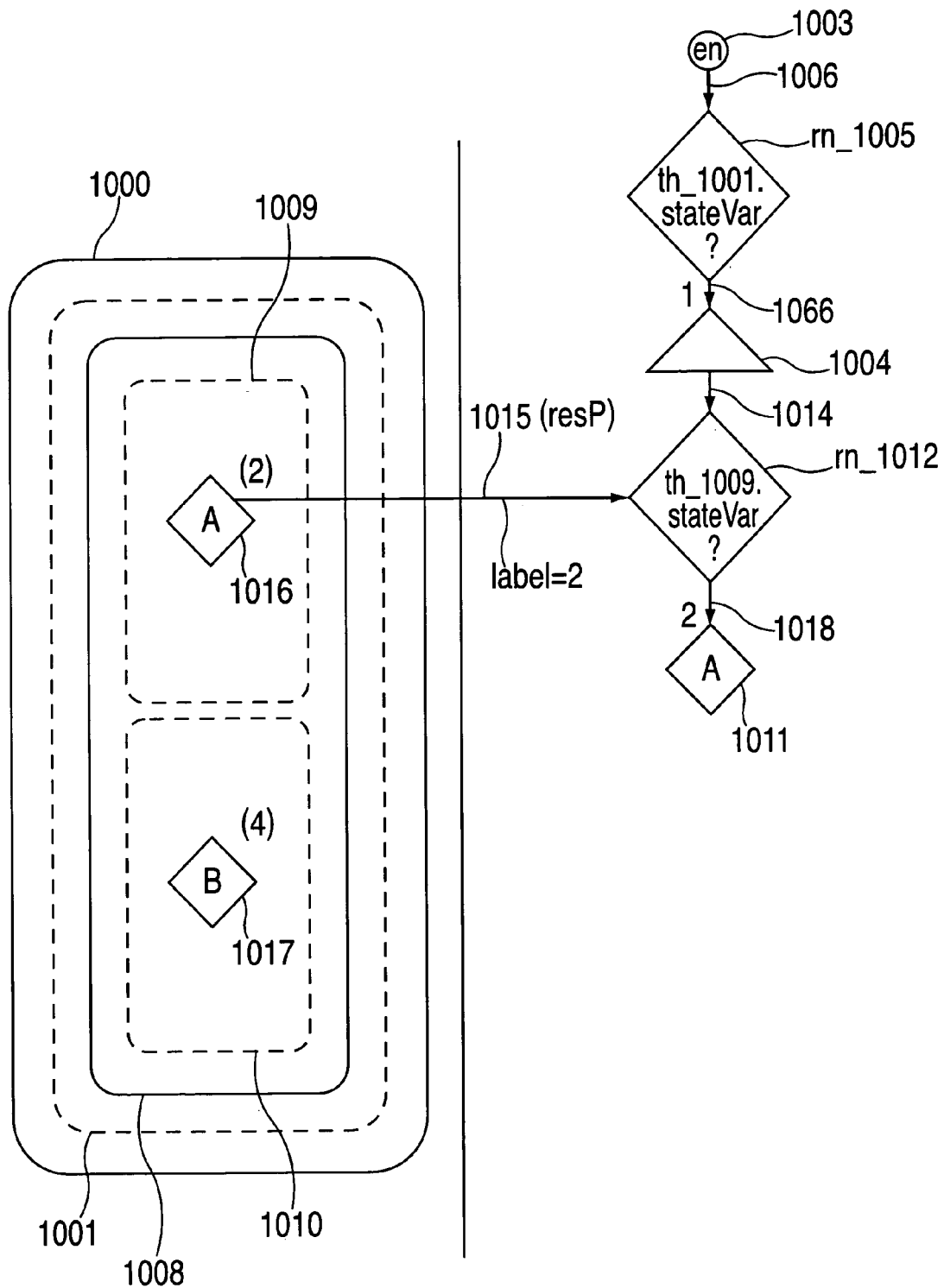
Figure 8E:
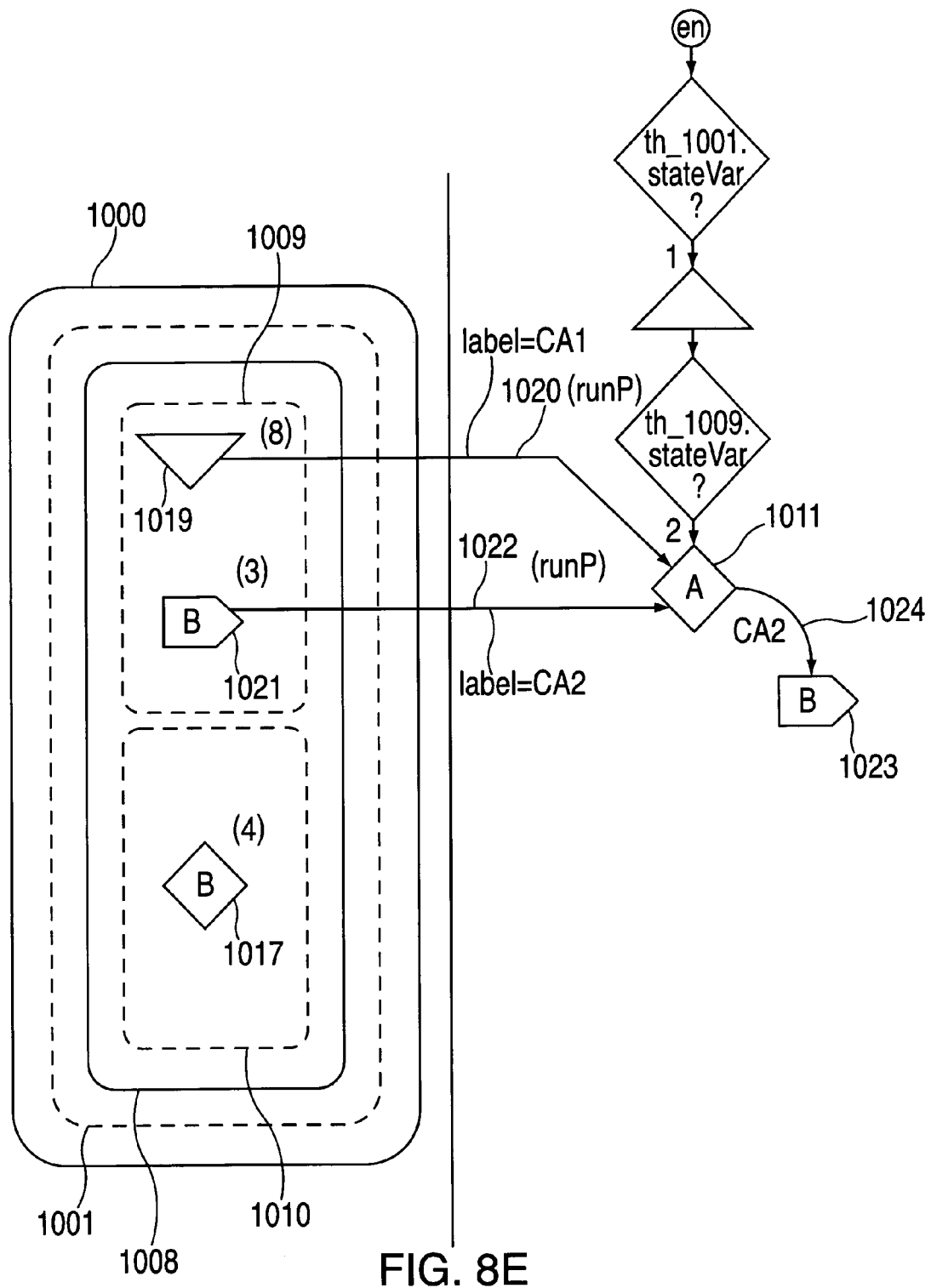

At this point, it is appropriate to consider the continued execution of Appendix A in conjunction with FIG. 8E.

Since current node conditional_A(2)_1016 is a normal cnode, rather than a fork cnode of the first iteration, code block D is executed next. Code block D iterates over each successor to conditional_A(2)_1016 in the ACCFG and adds it to thread_1009. It also makes sn_1011 the "runningPredecessor" of each successor to conditional_A(2)_1016 so that these successors will have the correct inbound edges generated in later iterations (specifically in iteration 3 for successor emit_B(3)_1021 and iteration 8 for join(8)_11019).

2.4 Iteration 3

Iteration 3, in which emit_B(3)_1021 is the current node, is executed next. Of the total of 8 iterations of the MAIN LOOP performed in processing the example of FIG. 7, iteration 3 is one of the simplest. This is because emit_B(3)_1021 is in a thread that is already running, so no context switching is necessary. The major actions of iteration 3 are to: i) make an SCFG copy of emit_B(3)_1021, this being node sn_1023; ii) attach an inbound edge 1024 to sn_1023 (based on conditional_A_1011 being the single runningPredecessor to emit_B(3)_1021); and iii) make the single successor to emit_B(3)_1021, conditional_C(6)_1025, have sn_1023 as its runningPredecessor.

Iteration 3 is similar to iteration 2 in that both are handling a current node "cn" of the normal type. Therefore, for both iterations, code blocks B and D are executed. The execution of "switch to thread thread_1009", in code block B, is much simpler for iteration 3 because thread_1009 is already running. The execution of code block D is similar in both iterations 2 and 3, except that in iteration 3 there is only one successor of "cn".

2.5 Iteration 4

Iteration 4, in which "cn" is conditional_B(4)_1017, is one of the most complex of the 8 iterations since a context switch, which saves the state of thread_1009, must be performed. Thread_1009 is suspended by adding state-saving nodes 1028 and 1031. Thread_1010 is "resumed" by adding a trivial restart node 1034, which has a single edge going to sn_1027 (the SCFG copy of conditional_B(4)_1017).

Iteration 4 is similar to iterations 2 and 3 in that code blocks B and D are executed. The execution of code block B differs in iteration 4 since scenario 3 is performed. This means that within the execution of "switch to thread thread_1010," an execution of "suspend any running thread in process_1008" is performed (see heading "4.b.switchTT.suspendART" of Appendix A).

Figure 8F:
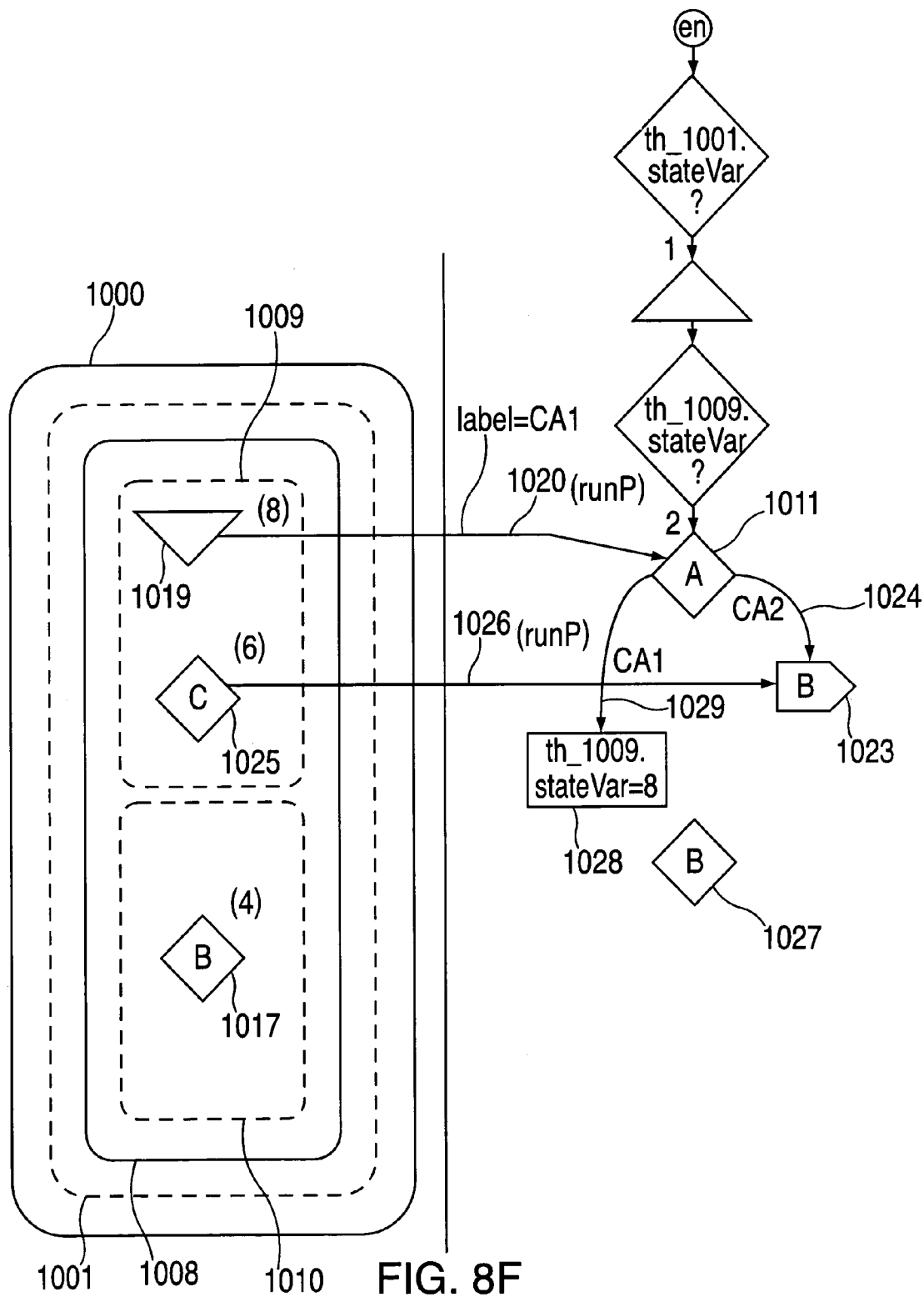
Figure 8G:
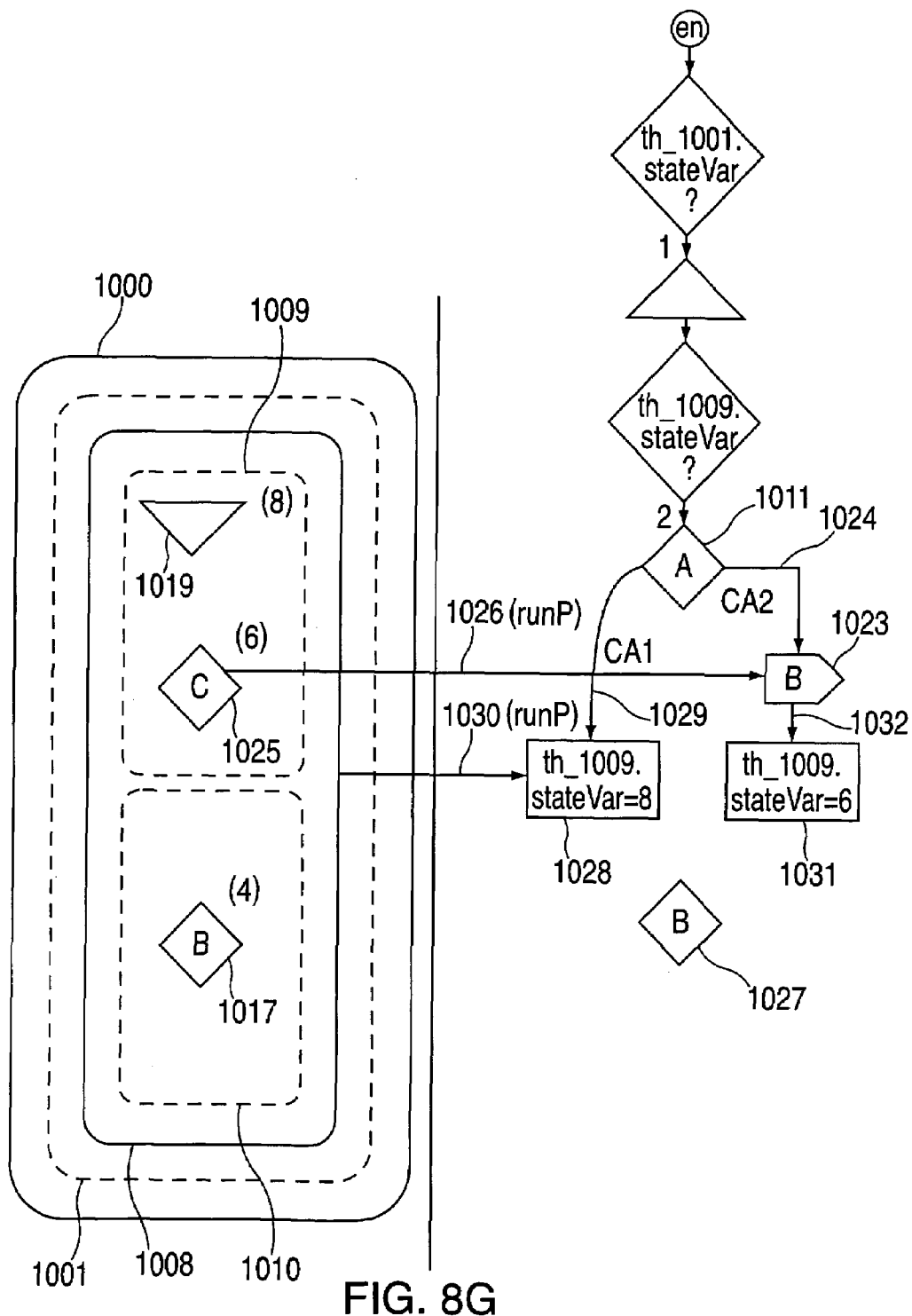
Figure 8H:
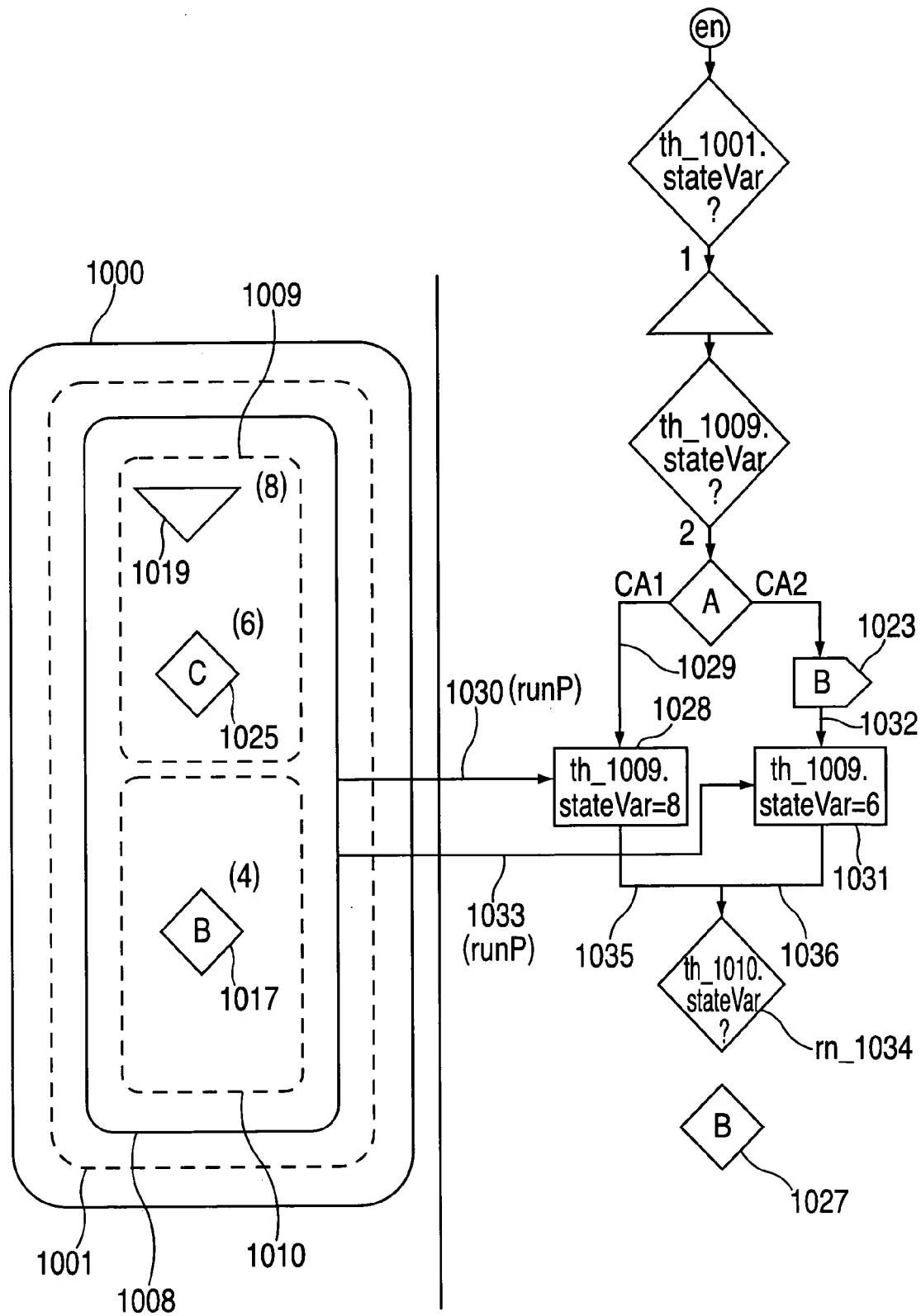

The execution of "suspend any running thread in process_1008" should be considered in conjunction with FIGS. 8F through 8H. This function suspends thread_1009 which has two runnable cnodes: conditional_C(6)_1025 and join(8)_1019. To distinguish between whether thread_1009 is being suspended with conditional_C(6)_1025 as the next to be executed (actually the SCFG copy of conditional_C(6)_1025 as the next to be executed) or with join(8)_11019 as the next to be executed, the state-saving nodes of, respectively, 1031 and 1028 are added.

State-saving node 1028 is given an assignment statement that stores an "8" in the stateVariable for thread_1009, while state-saving node 1031 is given an assignment statement that stores a "6." State-saving node 1028 is given in-bound edge 1029 since join(8)_1019 is a runningPredecessor of conditional_A_1011. State-saving node 1031 is given in-bound edge 1032 since conditional_C(6)_1025 is a runningPredecessor of conditional_A_1011.

When "switch to thread thread_1010" resumes, after "suspend any running thread in process_1008" completes, restart node 1034 is created (see FIG. 8H). Then "switch to thread thread_1010" executes "run cnode process_1008 as snode rn_1034" which adds the correct inbound edges to restart node 1034 from the two state-saving nodes (see FIG. 8H).

Once "switch to thread thread_1010" is completed, code block B executes "run cnode conditional_B(4)_1017 as snode sn_1027" which creates the single in-bound edge 1038 to sn_1027 (also known as conditional_B_1027). See FIG. 8I. While edge 1038 is given the label "4," meaning that thread_1010.stateVariable would appear to require initialization to the value 4 when the SCFG is to be executed, since 1038 is the only edge, it is always taken regardless of the value of the state variable.

Once code block B is completed, code block D is executed. See heading "4.d" of Appendix A and FIG. 8J. Code block D places the successors of conditional_B(4)_1017 in thread_1010. The result of this, as can be seen from FIG. 8J, is to put join(8) in two threads:

thread_1009 and thread_1010. Therefore, the "pthreads" property of join(8) will have both of these threads. Notice that while it is the same data object, join(8) is shown as join(8)_1019 in thread_1009 and as join(8)_1039 in thread_1010 in order to emphasize its location within two different threads.

2.6 Iteration 5

Iteration 5, in which the current node is emit_C(5), is a simple iteration like iteration 3. Like iteration 3, this simplicity is due to the fact that no context switching is necessary: thread 1010 is already running and emit_C(5) is simply added to that thread.

2.7 Iteration 6

Iteration 6 is like iteration 4 in that it also has a context switch. This switching between threads (from thread 1010 as running to thread 1009) means that scenario 3 of "switch to thread" is performed which, in turn, means that "suspend any running thread" is executed. The operation of "suspend any running thread" is simpler in iteration 6, than in iteration 4, since state-saving nodes are not needed (because thread 1010 will always resume at join(8)). "suspend any running thread in process_1008" makes conditional_B_1027 and emit_C_1043 runningPredecessors of process_1008. Therefore, when "switch to thread thread_1009" is subsequently resumed, the restart node it creates (node 1047) is given inbound edges from conditional_B_1027 and emit_C_1043 (See FIG. 8L). As part of code block B, iteration 6 also creates the edge 1052 from restart node 1047 to sn_1045. Edge 1052 has been appropriately labeled with "6." Restart node 1047 is the first, and only, non-trivial restart node resulting from the example of FIG. 7. Iteration 6 ends with code block D which adds the successors to conditional_C (6)_1025 to thread 1009 (See FIG. 8N).

2.8 Iteration 7

Iteration 7, in which the current node is emit_D(7), is a simple iteration like iterations 3 and 5. Like iterations 3 and 5, this simplicity is due to the fact that no context switching is necessary: thread 1009 is already running and emit_D(7) is simply added to that thread.

2.9 Iteration 8

Iteration 8 is the final iteration of the MAIN LOOP in which join(8) is converted into the SCFG. The fact that join(8) resides in two threads does not result in ambiguity: either thread can be selected by the pseudo-code at FIG. 6D, line 7. Unlike any other cnode type, a join node causes the MAIN LOOP to execute code block A. As can be seen, code block A simply uses the thread selected to identify its containing process. For either of threads 1009 or 1010, the containing process is 1008. As discussed above, process 1008 was created to represent join(8) and it is process 1008 that is "run" by code block A. Process 1008 is "run" in its parent thread 1001. Code block A executes a call to "switch to thread thread_1001" to confirm that outermost thread 1001 is running. The next call by code block A, to "suspend any running thread in process_1008," suspends thread 1009. "suspend any running thread in process_1008" converts the runningPredecessors and restartPredecessor of join(8)_1019 into runningPredecessors of process 1008. See FIG. 8P where edges 1051, 1052 and 1057 become, respectively, edges 1059, 1060 and 1061. Once this is done, code block A is then able to "run" process 1008 as snode 1058, which creates all the necessary remaining edges for the SCFG. The SCFG edges created are, namely, 1062 (for 1059), 1063 (for 1060) and 1064 (for 1061).

Since join(8) has no successors, code block D does nothing in iteration 8.

Figure 8I:
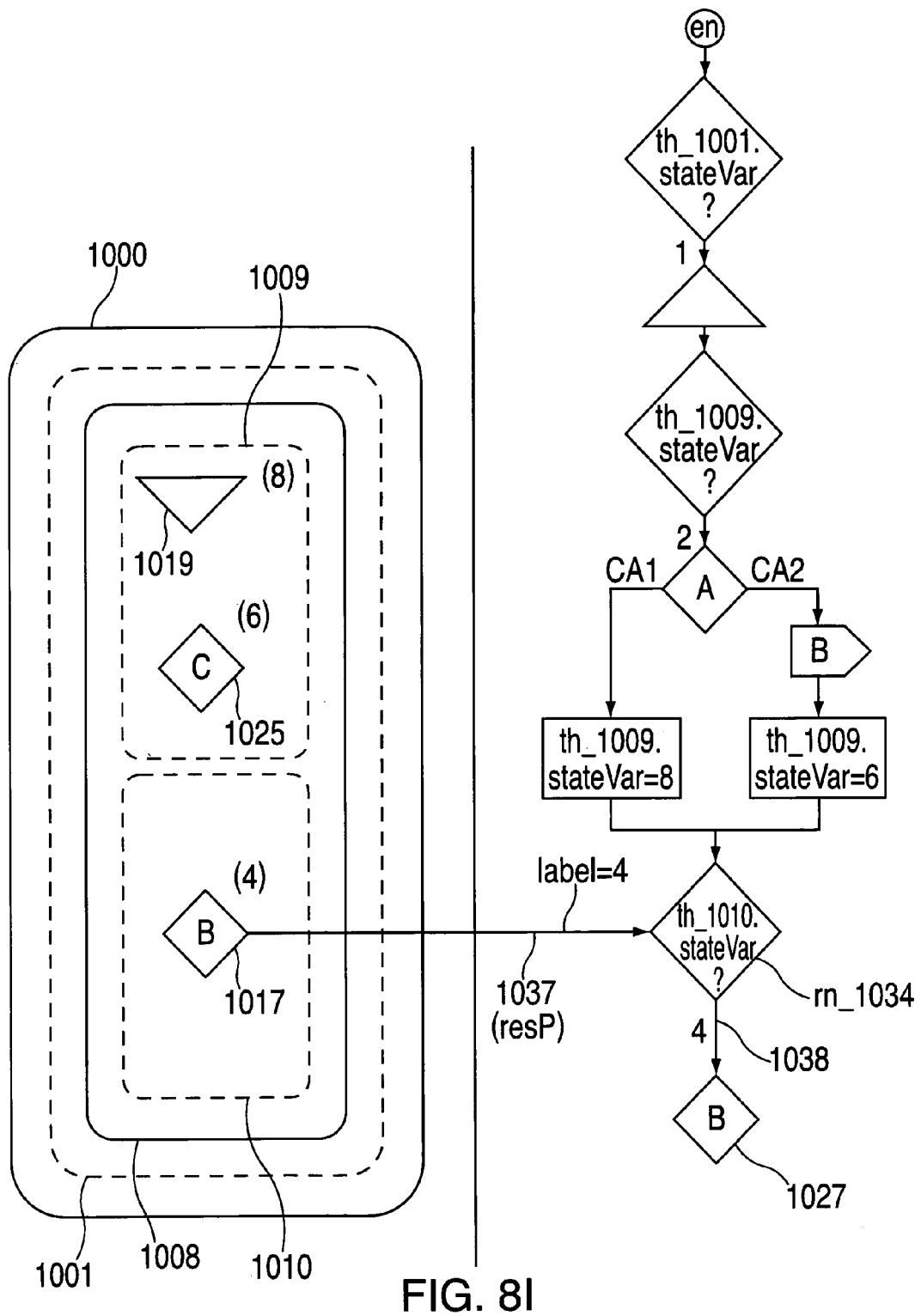
Figure 8J:
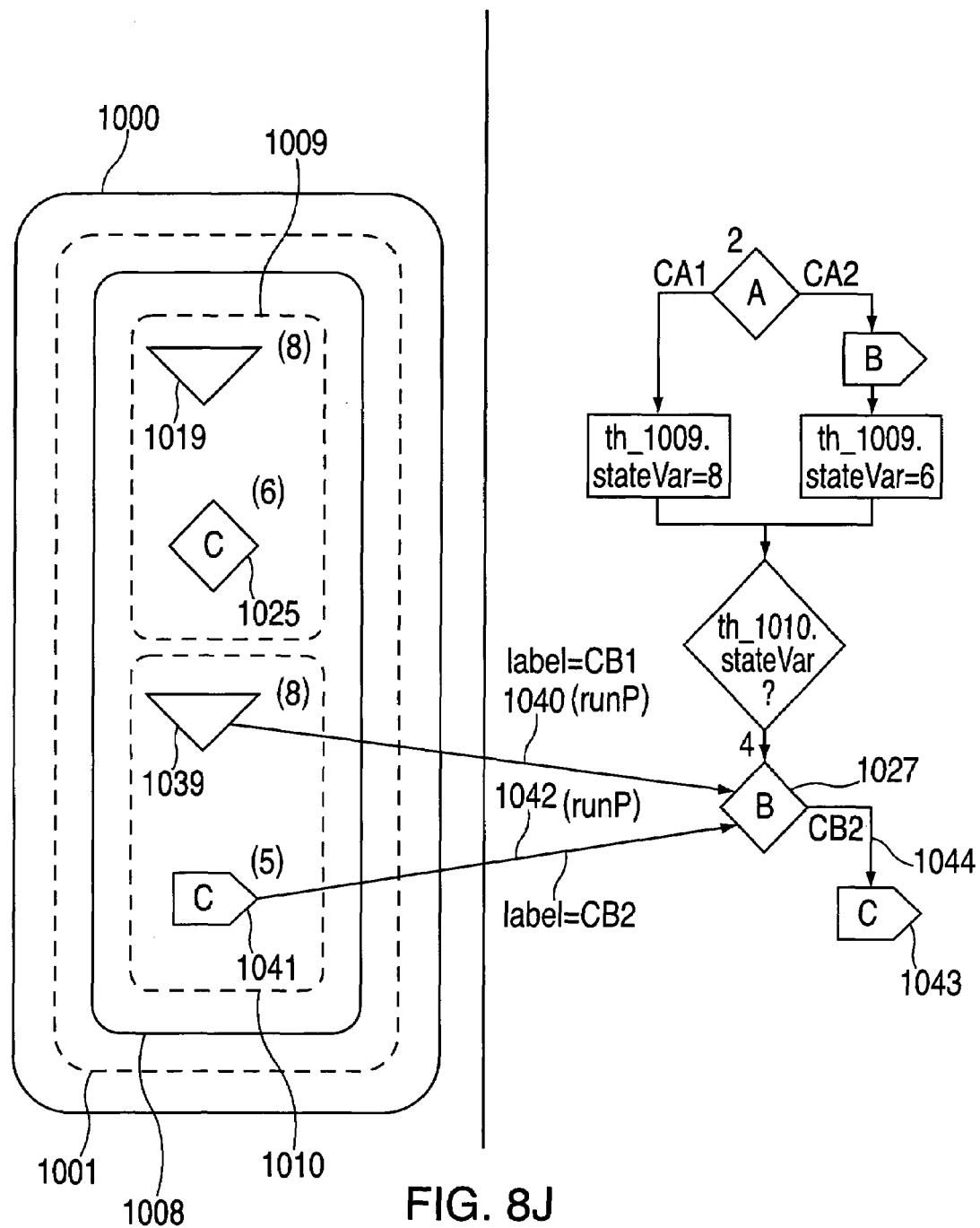
Figure 8K:
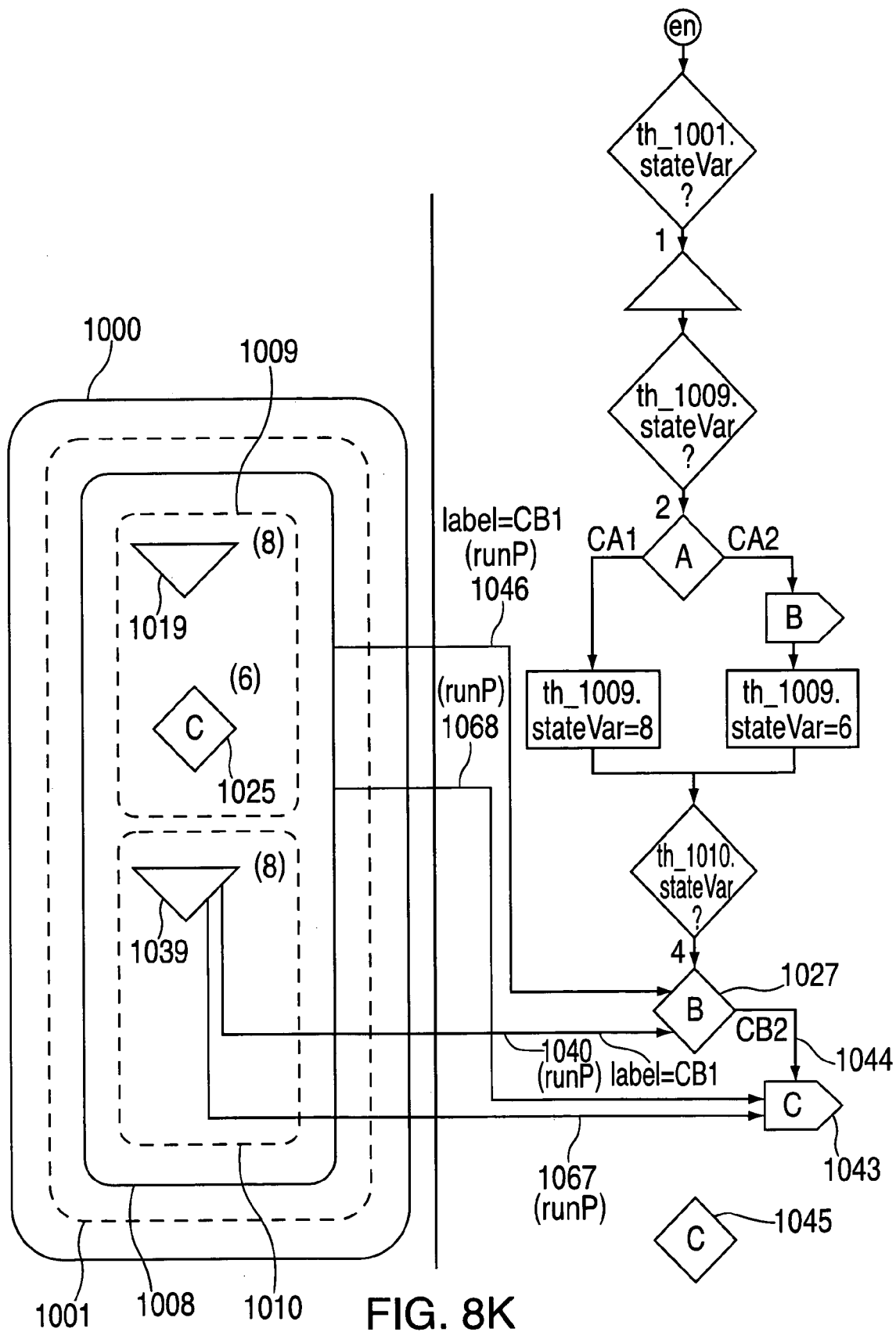

It should be noted that in FIGS. 8J and 8K, while only fork(8) 1039 is shown as having edges 1040 and 1067, this is for illustrative purposes and, in fact, fork(8) 1019 has the same edges. Similarly, it should be noted that in FIGS. 8M through 8P, that while only fork(8) 1019 is shown as having edges 1051, 1052 and 1057, this is for illustrative purposes and, in fact, fork(8) 1039 has the same edges.

Figure 8L:
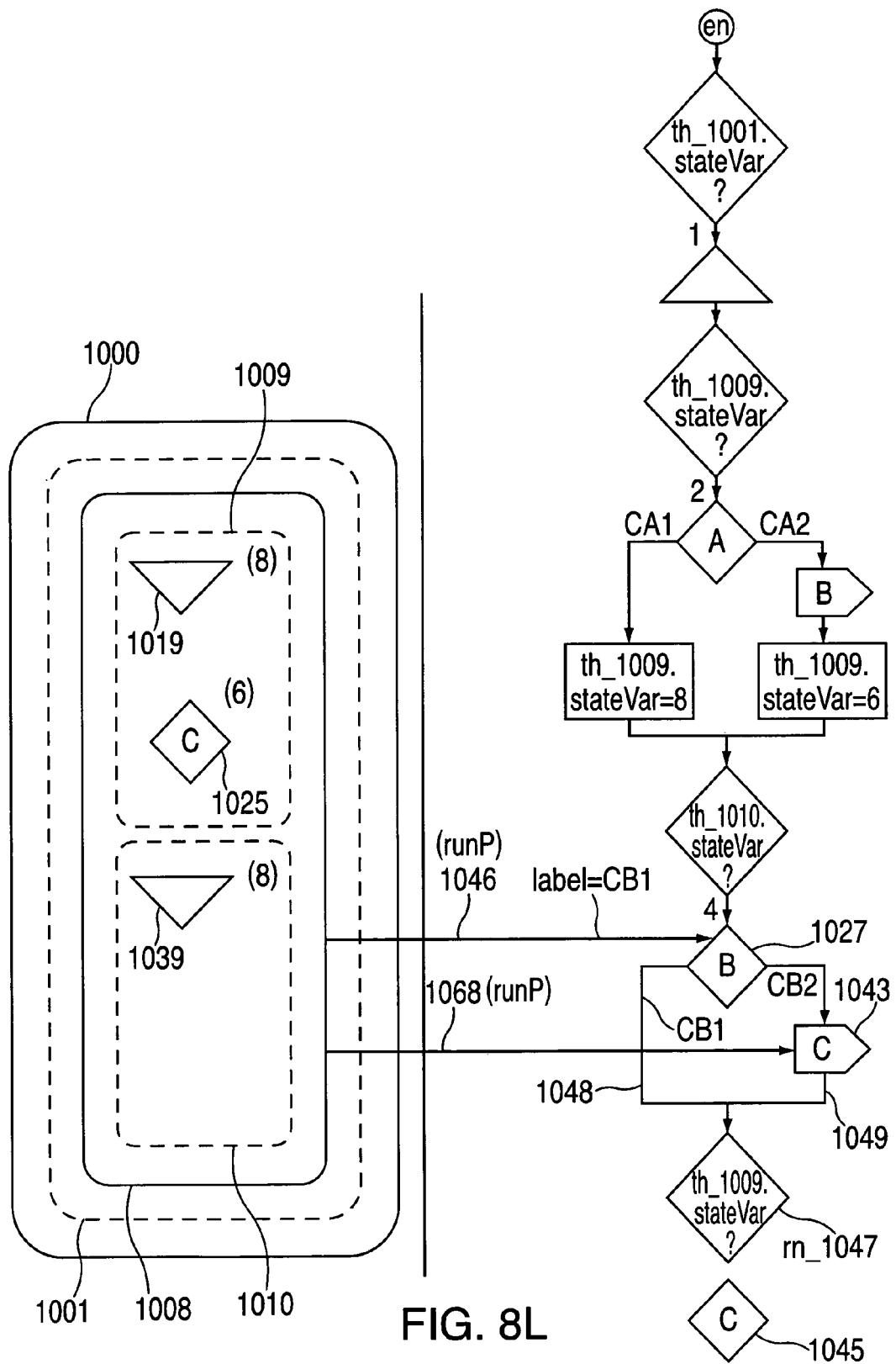
Figure 8M:
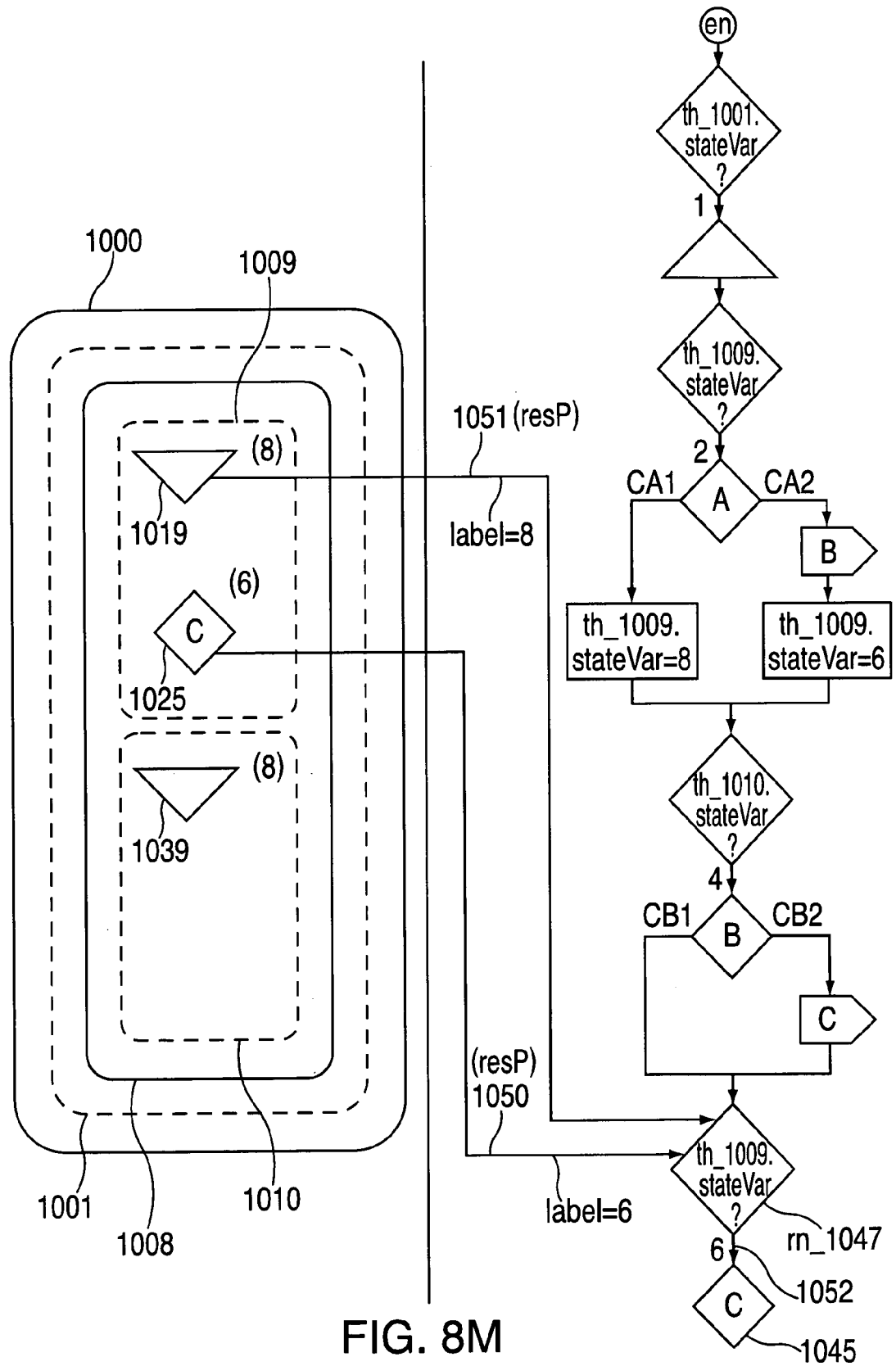
Figure 8N:
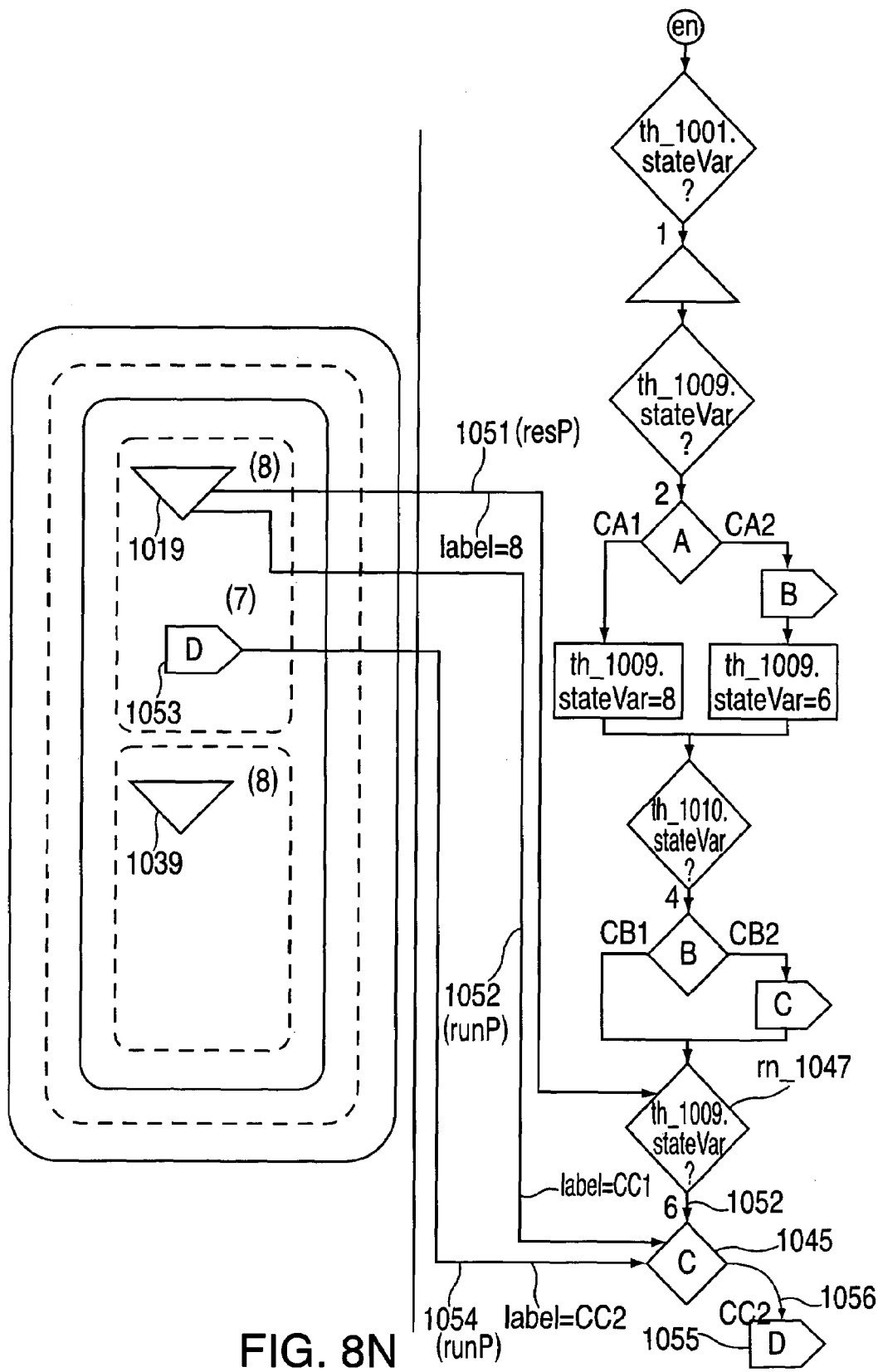
Figure 8P:
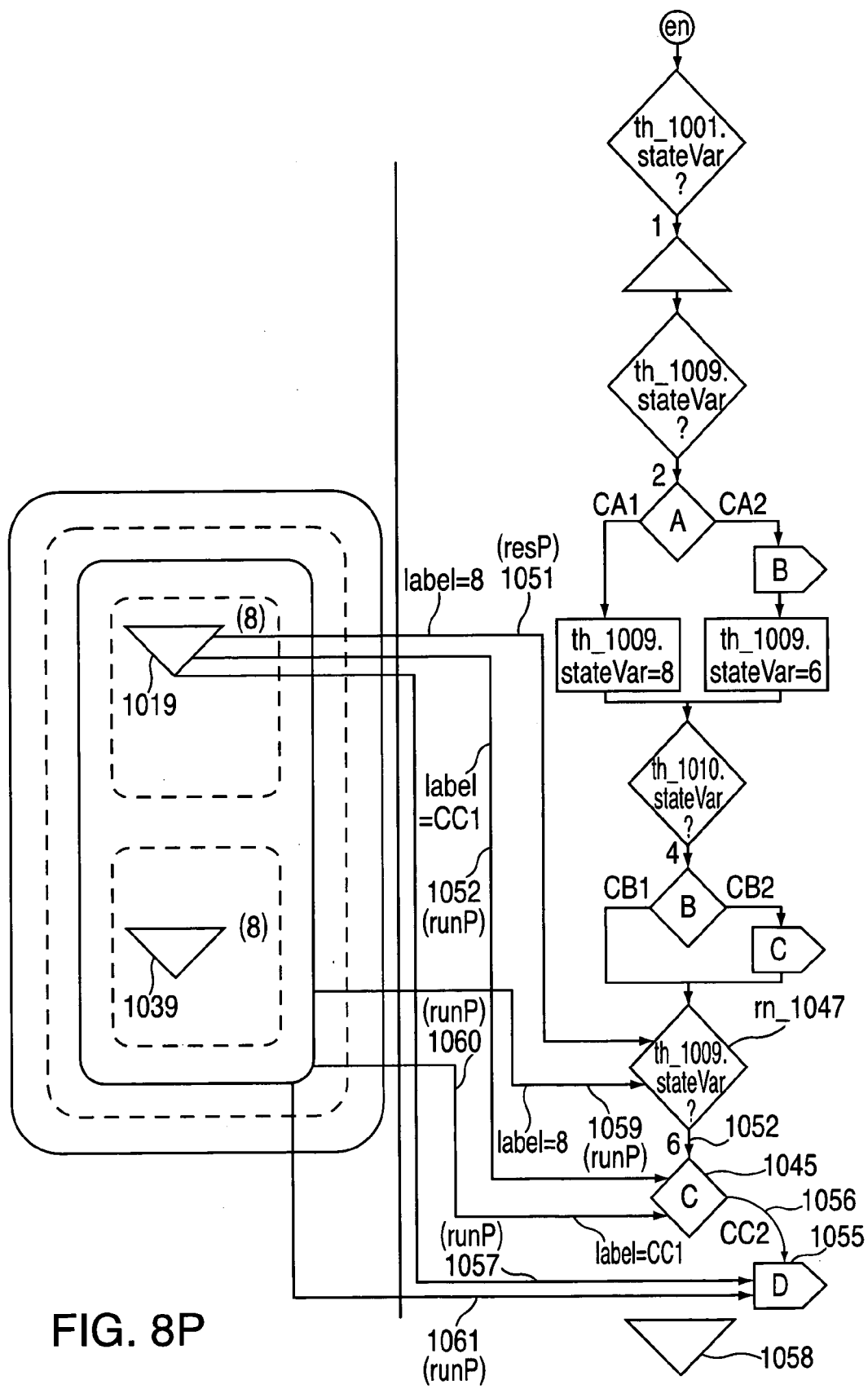
Figure 8Q:
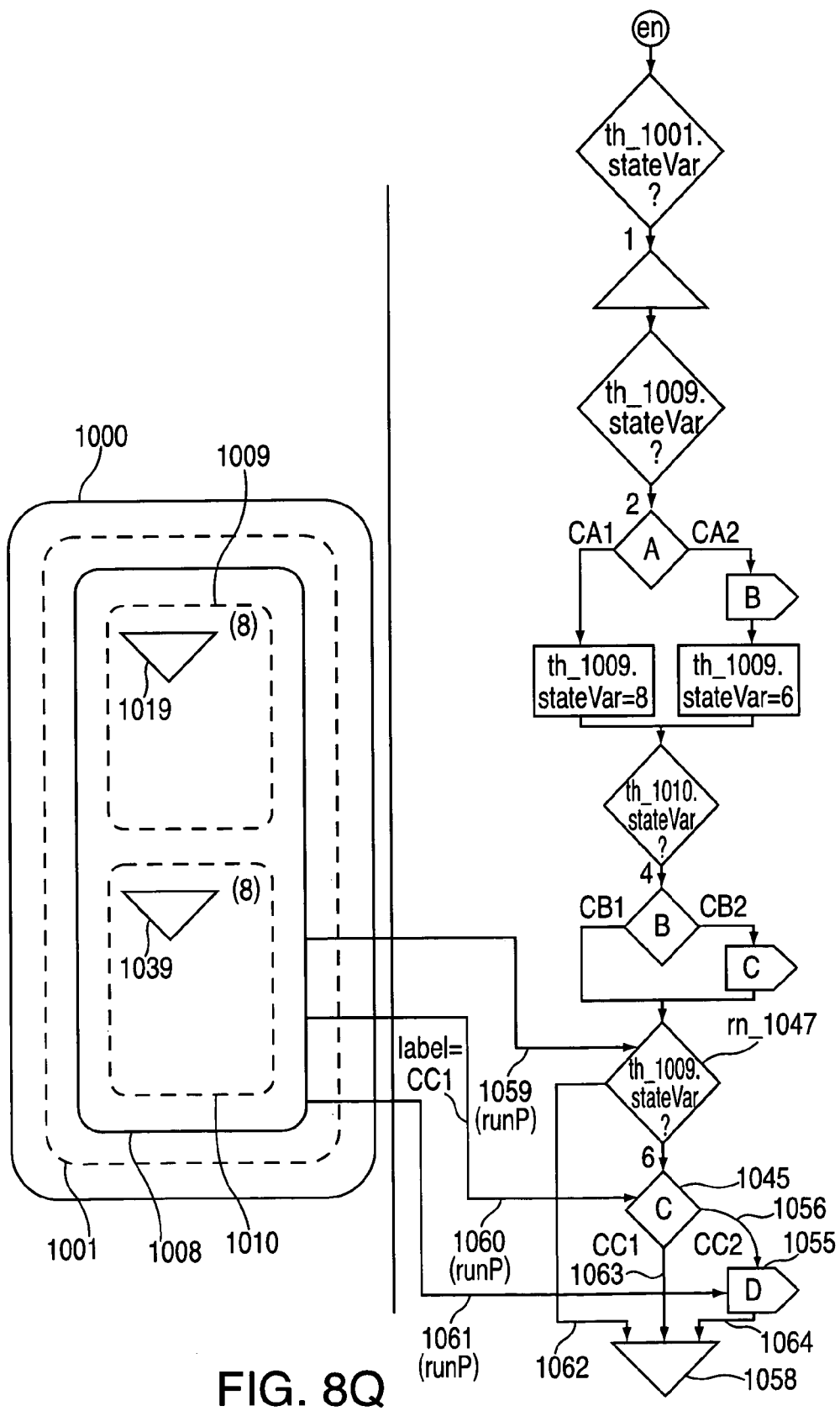

Since all 8 iterations of the MAIN LOOP have completed, "synthesize a scfg" returns with the SCFG shown on the right side of FIG. 8Q as its final product.

3. Hardware Environment

Figure 9:
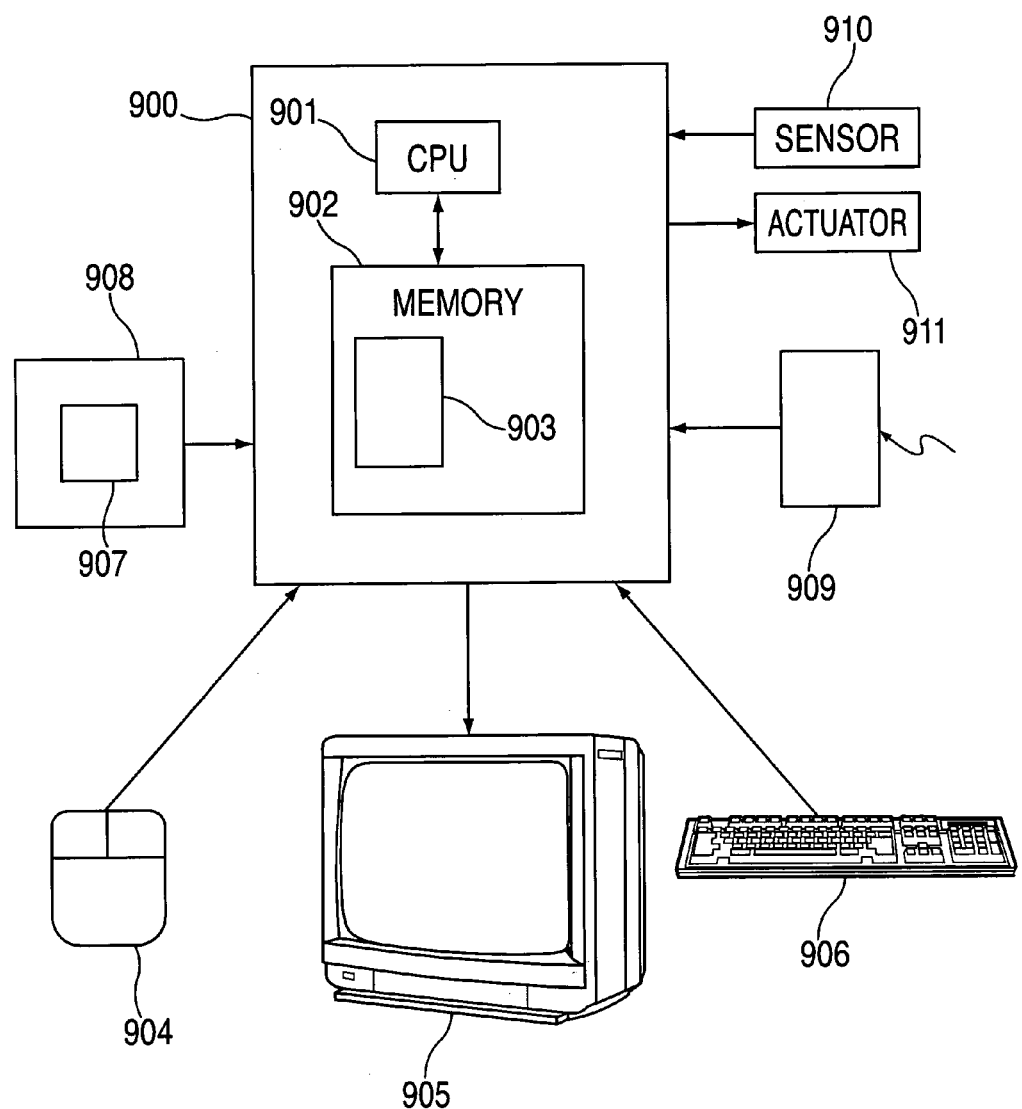
FIG. 9 depicts a hardware environment in which the present invention can be operated.

Typically, the conversion architecture of the present invention is executed within the computing environment (or data processing system) such as that of FIG. 9. FIG. 9 depicts a workstation computer 900 comprising a Central Processing Unit (CPU) 901 (or other appropriate processor or processors) and a memory 902. Memory 902 has a portion of its memory in which is stored the software tools and data of the present invention. While memory 903 is depicted as a single region, those of ordinary skill in the art will appreciate that, in fact, such software may be distributed over several memory regions or several computers. Furthermore, depending upon the computer's memory organization (such as virtual memory), memory 902 may comprise several types of memory (including cache, random access memory, hard disk and networked file server). Computer 900 is typically equipped with a display monitor 905, a mouse pointing device 904 and a keyboard 906 to provide interactivity between the software of the present invention and the chip designer. Computer 900 also includes a way of reading computer readable instructions from a computer readable medium 907, via a medium reader 908, into the memory 902. Computer 900 also includes a way of reading computer readable instructions via the Internet (or other network) through network interface 909. The software tools and data of the present invention may be stored as computer readable instructions on a computer readable medium, such as 907. The software tools and data of the present invention may also be transported into a computer system over a network and through a network interface, such as 909. Such network transmission may involve the use of a carrier wave.

As a target architecture for the present invention, upon which the sequential code produced from the SCFG would be executed, the system of FIG. 9 stores the target sequential code in region 903 of memory 902. The target architecture of the present invention can be substantially simpler than the architecture shown in FIG. 9. Specifically, one or more of the user interface components, such as 904, 905 and 906, are often not necessary. The target architecture of the present invention would often be an embedded system which could be used in a variety of applications such as: a wristwatch, a cellular telephone or the fuel injection of an automobile. Rather than the user interface components, such embedded systems would often include a variety of different sensor and/or actuator peripheral devices for interfacing the computing system with its operating environment. Element 910 of FIG. 9 represents, generally, any one of a variety of sensory input devices which might be used. Element 911 of FIG. 9 represents, generally, any one of a variety of actuator output devices which might be used.

While the invention has been described in conjunction with specific embodiments, it is evident that many alternatives, modifications and variations will be apparent to those skilled in the art in light of the foregoing description. Accordingly, it is intended to embrace all such alternatives, modifications and variations as fall within the spirit and scope of the appended claims and equivalents.

Appendix A

Express Mail No. EJ593691494US          S.A. Edwards

Begin "synthesize a scfg"

Initialization

/* See Figure 8A */ en = SCFG entry node 1003 op = outermost process 1000
process_1000.state = Runnable
process_1000.runningThread = none
process_1000.runningPredecessors += (en, - )

tt = outermost thread 1001
process_1000.threads += thread_1001 fn = fork(1)_1002 /* the first node of topological sort */ tt.stateVariable = fn.index /* Set default value of thread_1001's state variable to
the value 1 */ thread_1001.cnodes += fork(1)_1002 /* put fork(1) in thread_1001 */ fork(1)_1002.pthreads = thread_1001 /* make fork(1)'s thread be thread_1001 */
fork(1)_1002.state = Suspended /* make state of fork(1) be Suspended */

1. Main Loop: First Iteration cn = fork(1)_1002 /* result of first "for" loop assignment to cn */ sn = copy node cn and its expression to SCFG 1004 th = cn.pthreads = fork(1).pthreads = thread_1001

1.b Execution of code block B switch to thread thread_1001

1.b.switchTT Execution of switch to thread
    thread_1001.process = process_1000
    process_1000.pthreads = empty /* op does not belong to a thread, since
    it's outermost */

Appendix A

Express Mail No. EJ593691494US          S.A. Edwards p = thread_1001.process = process_1000 p.state == Runnable /* *due to initialization of process_1000* */

rn = new restart node 1005 which tests the thread_1001.stateVariable /* *Abbreviated as "th_1001.stateVar" in Figure 8A* */ run cnode process_1000 as snode rn_1005

<u>1.b.switchTT.runCAS  Execution of run cnode process_1000 as snode rn_1005</u>

/* *snp loops over each SCFG node pointed to by process_1000.runningPredecessors* */

/* *process_1000.runningPredecessors contains en_1003 from Initialization* */

/* *therefore, an edge 1006 is created from en_1003 to rn_1005. Since predecessor edge 1065 has no label, edge 1006 is given no label.* */

/* *Since op.restartPredecessor is empty from Initialization, run cnode p as snode rn ends at this point* */

<u>1.b.switchTT  Execution of switch to thread continues</u>

/* *See Figure 8B* */

/* *thread_1001.cnodes contains fork(1)_1002 from Initialization* */ cn = fork(1)_1002 /* *per only iteration of "for" loop in this invocation of switch to thread* */

fork(1)_1002.restartPredecessor = rn_1005 /* *establish a restartPredecessor edge 1007 from fork(1)_1002 to rn_1005, with edge 1007 being labeled with the topological index (of value 1) of fork(1)_1002* */

fork(1)_1002.state = Runnable process_1000.state = Running
process_1000.runningThread = thread_1001

Appendix A

Express Mail No. EJ593691494US                                      S.A. Edwards <u>1.b Execution of code block B</u> run cnode cn as snode sn /* *cn has been set to fork(1)_1002 by first iteration of main loop; sn has been set to 1004 by first code block after main "for" loop* */

<u>1.b.runCAS Execution of run cnode cn as snode sn</u>

/* *Since fork(1) 1002 has no runningPredecessors this "for" loop is not iterated over* */

/* *Since fork(1) 1002 has a restartPredecessor indicated by edge 1007 as being rn 1005, an edge 1066 is created from rn 1005 to sn 1004, with the edge 1066 being labeled by the label on edge 1007.* */

<u>1.b Execution of code block B</u> th.cnodes -= cn; /* *cn has been set to fork(1) 1002, so this statement removes 1002 from thread tt since it is no longer needed.* */

<u>1.c Execution of code block C</u>

/* *See Figure 8C* */ process = new process /* *This new process is process_1008. This is the process that represents fork(1), and this process will be around as long as there are threads of fork(1) yet to run.* */ process.state = Runnable /* *process_1008 is given a state of Runnable* */ process.runningThread = none /* *process_1008 is given no runningThread* */ process.runningPredecessors += (sn, -) /* *Establish an edge 1013 from process_1008 to sn 1004 with label = none.* */ th.cnodes += process /* *process_1008 is put inside thread_1001* */

/* *"for" loop iterates over each successor of cn (where cn has been set to fork(1) by the main "for" loop)* */ cns = conditional_A(2)_1016 /* *conditional_A(2)_1016 with topological ordering 2, is the first successor iterated over* */ thread = new thread /* *create a new thread, thread_1009, within which the thread that begins with conditional_A(2) will operate.* */

Appendix A

Express Mail No. EJ593691494US                  S.A. Edwards process.threads += thread   /* Add thread_1009 to process_1008 */ thread_1009.stateVariable = conditional_A(2)_1016.index   /* The state variable of thread_1009 is initialized to the default value of 2. */ thread.cnodes += cns;   /* Put conditional_A(2) inside thread_1009 as a cnode of the thread which could be executed next */ put cnode cns in thread thread/* conditional_A(2) has its thread indicated as 1009 */ cns.state = Suspended cns = conditional_B(4)   /* conditional "B," with topological ordering (4), is the second successor to fork(1) iterated over */ thread = new thread   /* create a new thread, thread_1010, within which the thread that begins with conditional_B(4) will operate. */ process.threads += thread   /* Add thread_1010 to process_1008 */ thread.stateVariable = conditional_B(4)_1017.index   /* The state variable of thread_1010 is initialized to the default value of 4. */ thread.cnodes += cns;   /* Put conditional_B(4) inside thread_1010 as a cnode of the thread which could be executed next */ put cnode cns in thread thread/* conditional_B(4) has its thread indicated as 1010 */ cns.state = Suspended

2. Main Loop: Second Iteration cn = conditional_A(2)_1016   /* result of second "for" loop assignment to cn */ sn = copy node cn and its expression to SCFG   /* see conditional_A 1011 of Figure 8C */ th = cn.pthreads = the thread of conditional_A(2)   /* Thread of conditional_A(2) set to 1009 by code block C above */

Appendix A

Express Mail No. EJ593691494US    S.A. Edwards 2.b Execution of code block B switch to thread thread_1009

2.b.switchTT Execution of switch to thread on thread 1009

/* th.process = process 1008; process_1008.pthreads = thread_1001 */

2.b.switchTT.switchTT Recursive execution of switch to thread on thread 1001

/* Basically, this recursive execution just makes sure that thread_1001, which contains the thread_1009 that is about to be set to a Running state, is itself already in a Running state. */

/* thread_1001.process = process_1000; process_1000.pthreads = empty */ p = thread_1001.process = process_1000 = op;

/* process_1000.state= Running and process_1000.runningThread = thread_1001, so no need to call "suspend any running thread in process p" */

/* since process_1000.state is not Runnable, no further action is taken by this recursive execution of switch to thread */

2.b.switchTT Execution of switch to thread on thread 1009

/* Now return to setting thread_1009 as running since it has been confirmed that its containing thread_1001 is already running */ p = thread_1009.process = process_1008;

p.state == Runnable /* due to previous execution of code block C in first main loop iteration, process_1008 is not already Running so there is no other running thread within it which would need to be suspended */ rn = new restart node 1012 which tests thread_1009.stateVariable run cnode process_1008 as snode rn _1012

2.b.switchTT.runCAS Execution of run cnode process 1008 as snode rn 1012

Appendix A

Express Mail No. EJ593691494US    S.A. Edwards

/* snp loops over each SCFG node pointed to by the runningPredecessors of cn (which is process_1008) */

/* process_1008.runningPredecessors contains fork_1004 */

/* create the edge 1014 from 1004 to m_1012. Edge 1014 is given no label, just as predecessor edge 1013 has no label. */

/* Since process_1008.restartPredecessor is empty from code block C, run cnode process_1008 as snode m_1012 ends at this point */

2.b.switchTT  Execution of switch to thread continues

/* See Figure 8D */

/* th.cnodes, which is thread_1009.cnodes, contains conditional_A(2)_1016 */ cn = conditional_A(2)_1016 /* per only iteration of "for" loop in this invocation of switch to thread */ cn.restartPredecessor = (rn_1012, conditional_A(2)_1016.index) /* Establish a restartPredecessor edge 1015 from conditional_A(2)_1016 to rn_1012, with edge 1015 being labeled with the topological index value 2 of conditional_A(2)_1016. */ cn.state = Runnable /* Set the state of conditional_A(2) 1016 to Runnable */ p.state = Running /* Set state of process_1008 to Running */
p.runningThread = th /* Set runningThread of process_1008 to be thread_1009 */

2.b Execution of code block B run cnode conditional_A(2)_1016 as snode sn_1011

2.b.runCAS Execution of "run cnode conditional A(2) 1016 as snode sn 1011"

/* Since conditional_A(2) 1016 has no runningPredecessors this "for" loop is not iterated over */

Appendix A

Express Mail No. EJ593691494US          S.A. Edwards

/* Since conditional_A(2) 1016 has a restartPredecessor indicated by edge 1015 as being rn 1012, an edge 1018 is created from rn 1012 to sn 1011, with the edge labeled by the label on edge 1015 */

2.b Execution of code block B th.cnodes -= cn; /* cn has been set to conditional_A(2) 1016, so this statement removes 1016 from thread_1009 since it is no longer needed. */

2.d Execution of code block D

/* See Figure 8E */

/* "for" loop over successors of conditional_A(2) */

/* cns is first set to successor join(8) */ th.cnodes += cns  /* thread_1009 has node join(8)_1019 */ put cnode cns in thread th /* join(8) 1019 is put on thread_1009 */ cns.runningPredecessors += (sn_1011, use edge condition from conditional_A(2) to join(8) of accfg)  /* Edge 1020 is given "CA1" as its edge label value */

/* cns is secondly set to successor emit_B(3) */ th.cnodes += cns  /* thread_1009 has node emit_B(3) 1021 */ put cnode cns in thread th /* emit_B(3) 1021 is put on thread_1009 */ cns.runningPredecessors += (sn_1011, use edge condition from conditional_A(2) to emit_B(3) of accfg)  /* Edge 1022 is given "CA2" as its edge label value */

3. Main Loop: Third Iteration cn = emit_B(3)  /* result of third "for" loop assignment to cn */ sn = copy node cn and its expression to SCFG <See 1023>

Appendix A

Express Mail No. EJ593691494US      S.A. Edwards th = cn.pthreads = thread of emit_B(3) 1021  /* Thread of emit_B(3) 1021 set to 1009 by code block D above */

3.b  Execution of code block B switch to thread thread_1009

3.b.switchTT  Execution of switch to thread on thread 1009

/* th.process = process 1008; process_1008.pthreads = thread_1001 */

3.b.switchTT.switchTT  Recursive execution of switch to thread on thread 1001

/* Basically, this recursive execution just makes sure that thread_1001, which contains the thread_1009, is itself already in a Running state. */

/* thread_1001.process = process_1000; process_1000.pthreads = empty */ p = thread_1001.process = process_1000 = op;

/* process_1000.state= Running  and process_1000.runningThread = thread_1001, so no need to call "suspend any running thread in process p" */

/* since process_1000.state is not Runnable, no further action is taken by this recursive execution of switch to thread */

3.b.switchTT  Execution of switch to thread on thread 1009

/* Now return to confirming thread_1009 as running since it has been confirmed that its containing thread_1001 is already running */ p = thread_1009.process = process_1008;

p.state == Running /* due to previous execution of code block B in second main loop iteration, process_1008 is already Running */ p.runningThread == thread_1009 /* due to previous execution of code block B in second main loop iteration, process_1008 already has thread th as its runningThread */

Appendix A

Express Mail No. EJ593691494US  S.A. Edwards

/* rest of switch to thread does nothing since p.state does not equal Runnable */

3.b Execution of code block B run cnode cn as snode sn /* cn has been set to emit_B(3) 1021 by third iteration of main loop; sn has been set to sn 1023 by first code block after main "for" loop */

3.b.runCAS Execution of "run cnode emit_B(3) 1021 as snode sn 1023"

/* Since emit_B(3) 1021 has 1011 in its runningPredecessors, as indicated by edge 1022, an edge 1024 is added from 1011 to 1023. Edge 1024 is given the same label as predecessor edge 1022 (which has edge label value "CA2"). */

/* Since emit_B(3) 1021 has no restartPredecessor, the rest of run cnode as snode is skipped */

3.b Execution of code block B th.cnodes -= cn; /* cn has been set to emit_B(3) 1021, so this statement removes 1021 from thread_1009 since it is no longer needed. */

3.d Execution of code block D

/* See Figure 8F */

/* "for" loop over successors of emit_B(3) */

/* cns is first set to successor conditional_C(6) */ th.cnodes += cns /* thread_1009 has node conditional_C(6)_1025 */ put cnode cns in thread th /* conditional_C(6)_1025 is put on thread_1009 */ cns.runningPredecessors += (sn, edge condition from emit_B(3) to conditional_C(6) in accfg) /* conditional_C(6) 1025 is given sn 1023 as its runningPredecessors, as indicated by edge 1026. Since the condition from emit_B(3) to conditional_C(6) in the accfg is none, no label is put on edge 1026. */

/* There are no more successors to emit_B(3) */

Appendix A

Express Mail No. EJ593691494US          S.A. Edwards

4. Main Loop: Fourth Iteration cn = conditional_B(4) 1017   /* *result of fourth "for" loop assignment to cn* */ sn = copy node cn and its expression to SCFG   /* *See conditional_B 1027 of Figure 8F* */ th = cn.pthreads = the thread of conditional_B(4) 1017   /* *Thread of conditional_B(4) 1017 set to 1010 by code block C of Iteration 1 above* */

4.b Execution of code block B switch to thread thread_1010

4.b.switchTT Execution of switch to thread on thread 1010

/* *th.process = process 1008; process_1008.pthreads = thread_1001* */

4.b.switchTT.switchTT Recursive execution of switch to thread on thread 1001

/* *Basically, this recursive execution just makes sure that thread_1001, which contains the thread_1010, is itself already in a Running state.* */

/* *thread_1001.process = process_1000; process_1000.pthreads = empty* */ p = thread_1001.process = process_1000 = op;

/* *process_1000.state= Running and process_1000.runningThread = thread_1001, so no need to call "suspend any running thread in process p"* */

/* *since process_1000.state is not Runnable, no further action is taken by this recursive execution of switch to thread* */

4.b.switchTT Execution of switch to thread on thread 1010

/* *Now return to switching from thread_1009 to thread_1010 as running since it has been confirmed that the containing thread, for both 1009 and 1010, is already running* */

Appendix A

Express Mail No. EJ593691494US             S.A. Edwards p = thread_1010.process = process_1008;

p.state == Running /* due to previous execution of code block B in second main loop iteration, process_1008 is already Running */ p.runningThread == thread_1009 /* due to previous execution of code block B in second main loop iteration */

/* Since process_1008.state == Running and process_1008.runningThread != thread_1010, suspend any running thread in process_1008 is executed */

<u>4.b.switchTT.suspendART Execution of suspend any running thread in process_1008</u> p.state = Runnable; /* change state of process_1008 from Running to Runnable */ th = p.runningThread; /* set th to thread_1009, the previously running thread of process_1008 */ needToSaveState = true; /* Since thread_1009 has more than one node (namely, nodes 1019 and 1025) in thread_1009.cnodes. */

/* "for" iterates over each cnode in thread_1009.cnodes */

/* First iteration of "for" sets cn to join(8) 1019 */

/* join(8) 1019 is not a process */

/* join(8)_1019.runningPredecessors is not empty (since it points to 1011) */ sn = new save state node with assignment that "thread_1009.stateVariable = 8" /* Since needToSaveState is true, the assignment of 1028 is created. */

/* "for" loop sets snp to each runningPredecessor of join(8)_1019 */

/* only iteration of "for" loop sets snp to 1011 */

/* only iteration of "for" loop creates edge 1029 from 1011 to 1028. Edge 1029 is given a label value taken from the predecessor edge of 1020. */

Appendix A

/* See Figure 8G */

/* process_1008 has 1028 added to its runningPredecessors list by edge 1030. No label value is given to edge 1030. */

/* fork(8)_1019 has no restartPredecessor */ fork(8)_1019.state = Suspended;

/* Second iteration of "for" sets cn to conditional_C(6)_1025 */

/* conditional_C(6)_1025 is not a process */

/* conditional_C(6)_1025.runningPredecessors is not empty (since it points to 1023) */ sn = new save state node with assignment that "thread_1009.stateVariable = 6" /* Since needToSaveState is true, the assignment of 1031 is created. */

/* "for" loop sets snp to each runningPredecessor of conditional_C(6)_1025 */

/* only iteration of "for" loop sets snp to 1023 */

/* only iteration of "for" loop creates edge 1032 from 1023 to 1031, where edge 1032 has no label since edge 1026 has no label. */

/* See Figure 8H */

/* process_1008 has 1031 added to its runningPredecessors list by arch 1033. */

/* conditional_C(6)_1025 has no restartPredecessor */ conditional_C(6)_1025.state = Suspended;

process_1008.runningThread = none; /* thread_1009 has been stopped, but thread_1010 has not yet been started */

<u>4.b.switchTT  Re-execution of switch to thread on thread 1010</u>

/* Now process_1008 is Runnable rather than Running */

Appendix A

Express Mail No. EJ593691494US          S.A. Edwards rn = new restart node testing thread_1010.stateVariable /* Create restart node 1034 */

run cnode process_1008 as snode rn_1034

> ### 4.b.switchTT.runCAS  Run cnode process 1008 as snode rn 1034
>
> /* "for" loop iterates over each runningPredecessor of process_1008 */
>
> snp = 1028  /* first runningPredecessor */
>
> /* create edge 1035 from 1028 to rn_1034 which has no label, just as 1030 has no label */
>
> snp = 1031  /* second runningPredecessor */
>
> /* create edge 1036 from 1031 to rn_1034 which has no label, just as 1033 has no label */

4.b.switchTT  Re-execution of switch to thread on thread 1010

/* See Figure 8I */ cn = conditional_B(4)_1017  /* first and only iteration of "for" loop */ cn.restartPredecessor = (rn_1034, conditional_B(4)_1017.index)  /* indicated by edge 1037 from conditional_B(4)_1017 to rn_1034 */ cn.state = Runnable process_1008.state = Running
      process_1008.runningThread = thread_1010

4.b Execution of code block B run cnode cn as snode sn /* cn has been set to conditional_B(4) 1017 by fourth iteration of main loop; sn has been set to sn 1027 by first code block after main "for" loop */

> ### 4.b.runCAS Execution of "run cnode conditional_B(4) 1017 as snode sn 1027"

Appendix A

Express Mail No. EJ593691494US         S.A. Edwards

/* Since conditional_B(4) 1017 has no runningPredecessors, this loop is skipped */

/* Since conditional_B(4) 1017 has a restartPredecessor, an edge 1038 is added from m_1034 to 1027. The condition of edge 1038 is taken from the label of edge 1037. */

4.b Execution of code block B th.cnodes -= cn; /* cn has been set to conditional_B(4) 1017, so this statement removes 1017 from thread_1010 since it is no longer needed. */

4.d Execution of code block D

/* See Figure 8J */

/* "for" loop over successors of conditional_B(4) 1017 */

/* cns is first set to successor join(8) */ th.cnodes += cns  /* thread_1010 has node join(8)_1039 */ put cnode cns in thread th /* join(8)_1039 is put on thread_1010 */ cns.runningPredecessors += (sn, edge condition from condition_B(4) to join(8) in the accfg) /* join(8)_1039 is given 1027 as its runningPredecessors, as indicated by edge 1040. Edge 1040 is given edge label value "CB1". */

/* cns is secondly set to successor emit_C(5) */ th.cnodes += cns  /* thread_1010 has node emit_C(5)_1041 */ put cnode cns in thread th /* emit_C(5)_1041 is put on thread_1010 */ cns.runningPredecessors += (sn, edge condition from condition_B(4) to emit_C(5) in the accfg) /* emit_C(5)_1041 is given 1027 as its runningPredecessors, as indicated by edge 1042. Edge 1042 is given edge label value "CB2". */

5. Main Loop: Fifth Iteration cn = emit_C(5) /* result of fifth "for" loop assignment to cn */

Appendix A

Express Mail No. EJ593691494US        S.A. Edwards sn = copy node cn and its expression to SCFG /* See emit_C 1043 */ th = cn.pthreads = the thread of emit_C(5) 1041 /* Thread of emit_C(5) 1041 set
to 1010 by code block D above */

5.b Execution of code block B switch to thread thread_1010

5.b.switchTT Execution of switch to thread on thread 1010

/* th.process = process 1008; process_1008.pthreads = thread_1001 */

5.b.switchTT.switchTT Recursive execution of switch to thread on thread 1001

/* Basically, this recursive execution just makes sure that
thread_1001, which contains the thread_1010, is itself already in a
Running state. */

/* thread_1001.process = process_1000; process_1000.pthreads =
empty */ p = thread_1001.process = process_1000 = op;

/* process_1000.state= Running and process_1000.runningThread
= thread_1001, so no need to call "suspend any running thread in
process p" */

/* since process_1000.state is not Runnable, no further action is
taken by this recursive execution of switch to thread */

5.b.switchTT Execution of switch to thread on thread 1010

/* Now return to confirming thread_1010 as running since it has been
confirmed that its containing thread_1001 is already running */ p = thread_1010.process = process_1008;

p.state == Running /* due to previous execution of code block B in second
main loop iteration, process_1008 is already Running */

Appendix A

Express Mail No. EJ593691494US          S.A. Edwards p.runningThread == thread_1010 /* due to previous execution of code block B in fourth main loop iteration, process_1008 already has thread th as its runningThread */

/* rest of switch to thread does nothing since p.state does not equal Runnable */

5.b Execution of code block B
       run cnode cn as snode sn /* cn has been set to emit_C(5)_1041 by fifth iteration of main loop; sn has been set to sn 1043 by first code block after main "for" loop */

5.b.runCAS Execution of "run cnode emit_C(5) 1041 as snode sn 1043"

/* Since emit_C(5) 1041 has 1027 in its runningPredecessors, as indicated by edge 1042, an edge 1044 is added from 1027 to 1043. Label of edge 1044 is taken from edge 1042. */

/* Since emit_C(5) 1041 has no restartPredecessor, the rest of run cnode as snode is skipped */

5.b Execution of code block B
       th.cnodes -= cn; /* cn has been set to emit_C(5) 1041, so this statement removes 1041 from thread_1010 since it is no longer needed. */

5.d Execution of code block D

/* See Figure 8K */

/* "for" loop over successors of emit_C(5) */

/* cns is set to only successor join(8)_1039 */

th.cnodes += cns /* thread_1010 already has node join(8)_1039 */ put cnode cns in thread th /* join(8)_1039 is already on thread_1010 */

cns.runningPredecessors += (sn, edge condition from emit_C(5) to join(8) in the accfg) /* join(8)_1039 has 1043 added to its runningPredecessors, as indicated by edge 1067. Edge 1067 has no label since there is no edge condition from emit_C(5) to join(8) in the accfg. */

Appendix A

Express Mail No. EJ593691494US          S.A. Edwards

/* There are no more successors to emit_C(5) */

6. Main Loop: Sixth Iteration cn = conditional_C(6) 1025 /* result of fourth "for" loop assignment to cn */ sn = copy node cn and its expression to SCFG <See 1045> th = cn.pthreads = the thread of conditional_C(6) 1025 /* Thread of conditional_C(6) 1025 set to 1009 by code block D of Iteration 3 above */

6.b Execution of code block B switch to thread th /* switch to thread 1009. Note we are changing from thread 1010 */

6.b.switchTT Execution of switch to thread on thread 1009

/* th.process = process 1008; process_1008.pthreads = thread_1001 */

6.b.switchTT.switchTT Recursive execution of switch to thread on thread 1009

/* Basically, this recursive execution just makes sure that thread_1001, which contains the thread_1009, is itself already in a Running state. */

/* thread_1001.process = process_1000; process_1000.pthreads = empty */ p = thread_1001.process = process_1000 = op;

/* process_1000.state= Running and process_1000.runningThread = thread_1001, so no need to call "suspend any running thread in process p" */

/* since process_1000.state is not Runnable, no further action is taken by this recursive execution of switch to thread */

6.b.switchTT Execution of switch to thread on thread 1009

Appendix A

/* Now return to switching from thread_1010 to thread_1009 as running since it has been confirmed that the containing thread, for both 1009 and 1010, is already running */ p = thread_1009.process = process_1008;

p.state == Running /* due to previous execution of code block B in fourth main loop iteration, process_1008 is already Running */ p.runningThread == thread_1010 /* due to previous execution of code block B in fourth main loop iteration */

/* Since process_1008.state == Running and process_1008.runningThread != thread_1009, suspend any running thread in process_1008 is executed */

<u>6.b.switchTT.suspendART Execution of suspend any running thread in process_1008</u> p.state = Runnable; /* change state of process_1008 from Running to Runnable */ th = p.runningThread; /* set th to thread_1010, the previously running thread of process_1008 */ restartNode = none;

needToSaveState = false; /* Since thread_1010 only one node (namely, node 1039) in thread_1010.cnodes. */

/* "for" iterates over each cnode in thread_1010.cnodes */

/* First iteration of "for" sets cn to join(8) 1039 */

/* join(8) 1039 is not a process */

/* join(8)_1039.runningPredecessors is not empty (since it points to 1027 and 1043) */

/* Since needToSaveState is false, the "else" clause is executed. */ snp = 1027 /* by "for" loop */

Appendix A

Express Mail No. EJ593691494US    S.A. Edwards

/* process_1008 has 1027 added to its runningPredecessors list by edge 1046. Edge 1046 gets the same label value as edge 1040 (where edge 1040 was given label value "CB1"). */ snp = 1043  /* by "for" loop */

/* process_1008 has 1043 added to its runningPredecessors list by edge 1068. Edge 1068 gets no label value since edge 1067 had no label value. */

/* fork(8)_1039 has no restartPredecessor */ fork(8)_1039.state = Suspended;

process_1008.runningThread = none; /* thread_1010 has been stopped, but thread_1009 has not yet been started */ restartNode == none /* nothing to do here */

6.b.switchTT  Re-execution of switch to thread on thread 1009

/* See Figure 8L */

/* Now process_1008 is Runnable rather than Running */ rn = new restart node testing thread_1009.stateVariable  /* Create restart node 1047 */ run cnode process_1008 as snode rn_1047

6.b.switchTT.runCAS  Run cnode process 1008 as snode rn 1047

/* "for" loop iterates over each runningPredecessor of process_1008 */ snp = 1027  /* first runningPredecessor */

/* create edge 1048 from 1027 to rn_1047. Edge 1048 is given edge label value "CB1" from edge 1046. */ snp = 1048  /* second runningPredecessor */

/* create edge 1049 from 1043 to rn_1047. Edge 1049 is given no edge label value since edge 1068 had no label value. */

Appendix A

6.b.switchTT Re-execution of switch to thread on thread 1009

/* See Figure 8M */ cn = conditional_C(6)_1025  /* first iteration of "for" loop */ cn.restartPredecessor = (rn_1047, conditional_C(6)_1025.index)  /* indicated by edge 1050 from conditional_C(6)_1025 to rn_1047. Edge 1050 is given a label value of 6. */ cn.state = Runnable cn = join(8)_1019  /* Second iteration of "for" loop */ cn.restartPredecessor = (rn_1047, join(8)_1019.index)  /* indicated by edge 1051 from join(8)_1019 to rn_1047. Edge 1051 is given a label value of 8. */ cn.state = Runnable process_1008.state = Running process_1008.runningThread = thread_1009

6.b Execution of code block B run cnode cn as snode sn  /* cn has been set to conditional_C(6) 1025 by sixth iteration of main loop; sn has been set to sn 1045 by first code block after main "for" loop */

6.b.runCAS Execution of "run cnode conditional_C(6) 1025 as snode sn 1045"

/* Since conditional_C(6) 1025 has no runningPredecessors, this loop is skipped */

/* Since conditional_C(6) 1025 has a restartPredecessor, an edge 1052 is added from rn_1047 to 1045. Edge 1052 is given the label value of edge 1050. */

6.b Execution of code block B

Appendix A

Express Mail No. EJ593691494US                                            S.A. Edwards th.cnodes -= cn; /* cn has been set to conditional_C(6) 1025, so this statement removes 1025 from thread_1009 since it is no longer needed. */

6.d Execution of code block D

/* See Figure 8N */

/* "for" loop over successors of conditional_C(6) 1025 */

/* cns is first set to successor join(8) */ th.cnodes += cns /* thread_1009 already has node join(8)_1019 */ put cnode cns in thread th /* join(8)_1019 is already on thread_1009 */ cns.runningPredecessors += (sn, edge condition from conditional_C(6) to join(8) in accfg) /* join(8)_1019 is given 1045 as its runningPredecessors, as indicated by edge 1052. Edge 1052 is given label value "CC1" since this is the edge condition from conditional_C(6) to join(8) in accfg. */

/* cns is secondly set to successor emit_D(7) */ th.cnodes += cns /* thread_1009 has node emit_D(7)_1053 */ put cnode cns in thread th /* emit_D(7)_1053 is put on thread_1009 */ cns.runningPredecessors += (sn, edge condition from conditional_C(6) to emit_D(7) in accfg) /* emit_D(7)_1053 is given 1045 as its runningPredecessors, as indicated by edge 1054. Edge 1054 is given label value "CC2" since this is the edge condition from conditional_C(6) to emit_D(7) in accfg. */

7. Main Loop: Seventh Iteration cn = emit_D(7) /* result of seventh "for" loop assignment to cn */ sn = copy node cn and its expression to SCFG /* See emit_D 1055 */ th = cn.pthreads = the thread of emit_D(7) 1053 /* Thread of emit_D(7) 1053 set to 1009 by code block D above */

7.b Execution of code block B

Appendix A

Express Mail No. EJ593691494US     S.A. Edwards switch to thread th /* switch to thread 1009 */

7.b.switchTT Execution of switch to thread on thread 1009

/* th.process = process 1008; process_1008.pthreads = thread_1001 */

7.b.switchTT.switchTT Recursive execution of switch to thread on thread 1001

/* Basically, this recursive execution just makes sure that thread_1001, which contains the thread_1009, is itself already in a Running state. */

/* thread_1001.process = process_1000; process_1000.pthreads =
15     empty */ p = thread_1001.process = process_1000 = op;

/* process_1000.state= Running and process_1000.runningThread
20     = thread_1001, so no need to call "suspend any running thread in process p" */

/* since process_1000.state is not Runnable, no further action is taken by this recursive execution of switch to thread */

7.b.switchTT Execution of switch to thread on thread 1009

/* Now return to confirming thread_1009 as running since it has been confirmed that its containing thread_1001 is already running */ p = thread_1009.process = process_1008;

p.state == Running /* due to previous execution of code block B in sixth main loop iteration, process_1008 is already Running */ p.runningThread == thread_1009 /* due to previous execution of code block B in sixth main loop iteration, process_1008 already has thread th as its runningThread */

/* rest of switch to thread does nothing since p.state does not equal Runnable */

7.b Execution of code block B

Appendix A

Express Mail No. EJ593691494US          S.A. Edwards run cnode cn as snode sn /* *cn has been set to emit_D(7)_1053 by seventh iteration of main loop; sn has been set to sn 1055 by first code block after main "for" loop* */

7.b.runCAS Execution of "run cnode emit_D(7) 1053 as snode sn 1055"

/* *Since emit_D(7) 1053 has 1045 in its runningPredecessors, as indicated by edge 1054, an edge 1056 is added from 1045 to 1055. Edge 1056 is labeled with value "CC2" which is taken from runningPredecessor edge 1054.* */

/* *Since emit_D(7) 1053 has no restartPredecessor, the rest of run cnode as snode is skipped* */

7.b Execution of code block B th.cnodes -= cn; /* *cn has been set to emit_D(7) 1053, so this statement removes 1053 from thread_1009 since it is no longer needed.* */

7.d Execution of code block D

/* *See Figure 8P* */

/* *"for" loop over successors of emit_D(7)* */

/* *cns is set to only successor join(8)_1019* */ th.cnodes += cns /* *thread_1009 already has node join(8)_1019* */ put cnode cns in thread th /* *join(8)_1019 is already on thread_1009* */ cns.runningPredecessors += (sn, edge condition from emit_D(7) to join(8) in accfg) /* *join(8)_1019 has 1055 added to its runningPredecessors, as indicated by edge 1057. There is no edge label.* */

/* *There are no more successors to emit_D(7)* */

8. Main Loop: Eighth Iteration cn = join(8) /* *result of eighth "for" loop assignment to cn* */ sn = copy node cn and its expression to SCFG /* *See join 1058* */

Appendix A

Express Mail No. EJ593691494US                    S.A. Edwards th = cn.pthreads  /* *Here there appears to be some ambiguity about which thread the join resides in. However, it does not matter whether thread 1009 or 1010 is selected since both threads reside in the same process, which is really the issue.* */

8.a  Execution of code block A p = th.process  /* *p set to the process of thread_1009 which is process_1008* */ th = p.pthreads  /* *th set to the thread of process_1008 which is thread_1001* */ switch to thread thread_1001

8.a.switchTT  Execution of switch to thread thread_1001 thread_1001.process = process_1000 process_1000.pthreads = empty  /* *No recursive call to switch to thread* */ p = th.process  /* *p = thread_1001.process = process_1000* */ process_1000.state = Running
process_1000.runningThread == thread_1001

/* *process_1000 is Running, but its runningThread is thread_1001 so no need to suspend any running thread in process_1000* */

/* *Since process_1000 is Running, this invocation of "switch to thread thread_1001" does nothing further* */

8.a  Execution of code block A suspend any running thread in process_1008;

8.a.suspendART Execution of suspend any running thread in process_1008 process_1008 == Running;

/* *Must suspend the running thread_1009* */ process_1008 = Runnable;

th = process_1008.runningThread = thread_1009

Appendix A

Express Mail No. EJ593691494US                                    S.A. Edwards

```
    restartNode = none;

needToSaveState = false;  /* Since only cnode of thread_1009 is
    join(8)_1019 */ cn = join(8)_1019  /* Only iteration of outermost "for" sets cn to
    thread_1009.cnodes */

    cn != process  /* No need to suspend any running process in join(8)_1019
    */ join(8)_1019.runningPredecessors != empty  /* in fact, it has 1045 and
    1055 */
    /* Since needToSaveState == false, do the "else" clause */ snp = rn_1045  /* First iteration of else's "for" finds rn_1045 as
    runningPredecessor of join(8)_1019 */
    process_1008.runningPredecessors += (rn_1045, take label from edge
    1052) /* See edge 1060 which is given label value "CC1" from edge 1052
    */

    snp = rn_1055  /* Second iteration of else's "for" finds rn_1055 as
    runningPredecessor of join(8)_1019 */ process_1008.runningPredecessors += (rn_1055, take label from edge
    1057) /* See 1061 which is given no label value since edge 1057 has no
    label value */

/* join(8)_1019.restartPredecessor != none; has rn_1047 */ restartNode = rn_1047;
    join(8)_1019.state = Suspended;

process_1008.runningThread = none;

    restartNode != none;  /* Contains node rn_1047 */ process_1008.runningPredecessors += (rn_1047, -);  /* Add edge 1059 to
    process_1008 and give it no label value */
```

Appendix A

Express Mail No. EJ593691494US    S.A. Edwards

8.a Execution of code block A

/* Figure 8Q */ run cnode process_1008 as snode 1058

8.a.runCAS Execution of run cnode process_1008 as snode 1058 snp = 1047 /* First iteration of "for" each process_1008.runningPredecessors */ add edge 1062 from 1047 to 1058; /* Edge 1062 gets the label of edge 1059 */ snp = 1045 /* Second iteration of "for" each process_1008.runningPredecessors */ add edge 1063 from 1045 to 1058; /* Edge 1063 gets the label of edge 1060 */ snp = 1055 /* Third iteration of "for" each process_1008.runningPredecessors */ add edge 1064 from 1055 to 1058;

8.a Execution of code block A thread_1001.cnodes -= process_1008

8.d Execution of code block D

/* Since join(8) has no successors, code block D does nothing */

/* Since there are no further cnodes in topological sort, beyond join(8), main loop ends */

What is claimed is:

1. A method performed by a data processing system having a memory, comprising the steps of:
   inputting a concurrent control flow graph (CCFG);
   scheduling the CCFG to produce a scheduled CCFG;
   selecting, while a first thread is running, a first node of the scheduled CCFG;
   producing a first copy of the first node for a sequential control flow graph (SCFG);
   determining that the first node is in a second thread, different from the first thread;
   coupling, to each of a plurality of nodes of the SCFG indicated by the first thread, a node that saves a representation, of a flow of control state of the first thread, in a first state variable, wherein the first state variable is not used to save a representation of a flow of control state of the second thread; and
   coupling, as a successor node to each node that saves a representation, the same successor node for resuming a flow of control state of the second thread by reading a second state variable and choosing an edge to a node to be executed next in the second thread, wherein the successor node has an outgoing edge to each node that can be executed next in the second thread and the second state variable is not used to save a representation of a flow of control state of the first thread.

2. The method of claim 1, wherein each node that saves a representation, and the successor node, are comprised of code that saves a state of a thread being suspended in a state variable and that resumes another thread by performing a multiway branch on a state variable for a thread being resumed.

3. The method of claim 1, wherein for each node of the CCFG, at most one corresponding node in the SCFG is produced.

4. The method of claim 1, wherein the step of scheduling comprises a topological sort for determining the scheduled CCFG.

5. The method of claim 1, wherein an execution of the SCFG comprises translation of the SCFG into a programming language.

6. The method of claim 5, wherein the programming language is C.

7. The method of claim 1, further comprising a step of translation of the SCFG into a programming language.

8. The method of claim 7, further comprising a step of executing the programming language translation of the SCFG.

9. The method of claim 1, wherein an execution of the SCFG comprises interpretation of the SCFG.

10. A data processing system having a memory, comprising the following:
    a sub-system configured for inputting a concurrent control flow graph (CCFG);
    a sub-system configured for scheduling the CCFG to produce a scheduled CCFG;
    a sub-system configured for selecting, while a first thread is running, a first node of the scheduled CCFG;
    a sub-system configured for producing a first copy of the first node for a sequential control flow graph (SCFG);
    a sub-system configured for determining that the first node is in a second thread, different from the first thread;
    a sub-system configured for coupling, to each of a plurality of nodes of the SCFG indicated by the first thread, a node that saves a representation, of a flow of control state of the first thread, in a first state variable, wherein the first state variable is not used to save a representation of a flow of control state of the second thread; and
    a sub-system configured for coupling, as a successor node to each node that saves a representation, the same successor node for resuming a flow of control state of the second thread by reading a second state variable and choosing an edge to a node to be executed next in the second thread, wherein the successor node has an outgoing edge to each node that can be executed next in the second thread and the second state variable is not used to save a representation of a flow of control state of the first thread.

11. A computer program product comprising a computer usable medium having computer readable code embodied therein, the computer program product including:
    computer readable program code devices configured to cause a computer to effect inputting a concurrent control flow graph (CCFG);
    computer readable program code devices configured to cause a computer to effect scheduling the CCFG to produce a scheduled CCFG;
    computer readable program code devices configured to cause a computer to effect selecting, while a first thread is running, a first node of the scheduled CCFG;
    computer readable program code devices configured to cause a computer to effect producing a first copy of the first node for a sequential control flow graph (SCFG);
    computer readable program code devices configured to cause a computer to effect determining that the first node is in a second thread, different from the first thread;
    computer readable program code devices configured to cause a computer to effect coupling, to each of a plurality of nodes of the SCFG indicated by the first thread, a node that saves a representation, of a flow of control state of the first thread, in a first state variable, wherein the first state variable is not used to save a representation of a flow of control state of the second thread; and
    computer readable program code devices configured to cause a computer to effect coupling, as a successor node to each node that saves a representation, the same successor node for resuming a flow of control state of the second thread by reading a second state variable and choosing an edge to a node to be executed next in the second thread, wherein the successor node has an outgoing edge to each node that can be executed next in the second thread and the second state variable is not used to save a representation of a flow of control state of the first thread.

12. A computer data signal embodied in a carrier wave and representing sequences of instructions which, when executed by a processor, cause performance of steps of:
    inputting a concurrent control flow graph (CCFG);
    scheduling the CCFG to produce a scheduled CCFG;
    selecting, while a first thread is running, a first node of the scheduled CCFG;
    producing a first copy of the first node for a sequential control flow graph (SCFG);
    determining that the first node is in a second thread, different from the first thread;
    coupling, to each of a plurality of nodes of the SCFG indicated by the first thread, a node that saves a representation, of a flow of control state of the first thread, in a first state variable, wherein the first state variable is not used to save a representation of a flow of control state of the second thread; and coupling, as a successor node to each node that saves a representation, the same successor node for resuming a flow of control state of the second thread by reading a second state variable and choosing an edge to a node to be executed next in the second thread, wherein the successor node has an outgoing edge to each node that can be executed next in the second thread and the second state variable is not used to save a representation of a flow of control state of the first thread.

* * * * *